United States Patent
Kurashima et al.

(10) Patent No.: US 7,965,831 B2
(45) Date of Patent: Jun. 21, 2011

(54) TELEPHONE CONTROL DEVICE, TELEPHONE CONTROL METHOD, TELEPHONE CONTROL PROGRAM, TELEPHONE TERMINAL, TELEPHONE CALLING METHOD, TELEPHONE CALLING PROGRAM AND TELEPHONE CONTROL SYSTEM

(75) Inventors: Akihisa Kurashima, Tokyo (JP); Kazuhiro Sakata, Tokyo (JP)

(73) Assignee: NEC Corporation, Tokyo (JP)

( * ) Notice: Subject to any disclaimer, the term of this patent is extended or adjusted under 35 U.S.C. 154(b) by 725 days.

(21) Appl. No.: 11/918,126

(22) PCT Filed: Apr. 11, 2006

(86) PCT No.: PCT/JP2006/308005
§ 371 (c)(1),
(2), (4) Date: Oct. 10, 2007

(87) PCT Pub. No.: WO2006/109883
PCT Pub. Date: Oct. 19, 2006

(65) Prior Publication Data
US 2008/0192917 A1 Aug. 14, 2008

(30) Foreign Application Priority Data

Apr. 11, 2005 (JP) ................................. 2005-113376
Apr. 10, 2006 (JP) ................................. 2006-107552

(51) Int. Cl.
*H04M 7/00* (2006.01)
(52) U.S. Cl. ..................... 379/221.14; 379/219; 379/225
(58) Field of Classification Search ............. 379/221.14, 379/114.02, 219, 225
See application file for complete search history.

(56) References Cited

U.S. PATENT DOCUMENTS
7,352,851 B1 * 4/2008 Semba et al. ............ 379/114.02

FOREIGN PATENT DOCUMENTS
| JP | 3-104367 | 5/1991 |
| JP | 4-249994 | 9/1992 |
| JP | 2003-78934 | 3/2003 |

* cited by examiner

*Primary Examiner* — Thjuan K Addy
(74) *Attorney, Agent, or Firm* — McGinn IP Law Group, PLLC

(57) ABSTRACT

The present invention realizes a telephone system which enables calling with ease from an outside line to a desired extension telephone terminal in an extension telephone network having a plurality of representative numbers. The telephone control device connected to a plurality of telephone terminals and a plurality of telephone exchange devices, includes a designation accepting unit which accepts designation of a calling destination telephone number from a telephone terminal, a connection setting unit which selects a telephone exchange device from the plurality of telephone exchange devices based on a calling destination telephone number accepted by the designation accepting unit to execute connection setting at the selected telephone exchange device so as to connect a call from a telephone terminal which designates the calling destination telephone number to the calling destination telephone number, and a telephone number information transmission unit which transmits telephone number information of a telephone exchange device selected by the connection setting unit to a telephone terminal which designates a calling destination telephone number.

20 Claims, 23 Drawing Sheets

FIG. 2

| TELEPHONE TERMINAL INFORMATION | |
|---|---|
| TERMINAL ID: | TELEPHONE NUMBER: |
| 000001: | 09011112222 |
| 000002: | 09022223333 |
| 000003: | 08033334444 |

FIG. 3

| TELEPHONE EXCHANGE DEVICE INFORMATION | | | |
|---|---|---|---|
| TELEPHONE EXCHANGE DEVICE ID: | REPRESENTATIVE TELEPHONE NUMBER: | TELEPHONE EXCHANGE DEVICE ADDRESS: | CORRESPONDING TELEPHONE NUMBER |
| 001: | 0311111111: | 192.168.0.1: | 「TELEPHONE NUMBER STARTING WITH "810"」 |
| 002: | 0441111111: | 192.168.1.1: | 「TELEPHONE NUMBER STARTING WITH "822"」 |
| 003: | 0611111111: | 192.168.2.1: | 「TELEPHONE NUMBER STARTING WITH "06"」 |

FIG. 4

| CALL CONTROL INFORMATION | | |
|---|---|---|
| CALLING SOURCE TELEPHONE NUMBER: | REQUESTED TELEPHONE NUMBER: | TELEPHONE EXCHANGE DEVICE ID |
| 09011112222: | 81072764: | 001 |
| 09022223333: | 82222330: | 002 |
| 08033334444: | 81032100: | 001 |

FIG. 15

| TELEPHONE EXCHANGE DEVICE INFORMATION | | | |
|---|---|---|---|
| TELEPHONE EXCHANGE DEVICE ID: | REPRESENTATIVE TELEPHONE NUMBER: | TELEPHONE EXCHANGE DEVICE ADDRESS: | CORRESPONDING TELEPHONE NUMBER |
| 001: | 0311111111: | 192.168.0.1: | 「TELEPHONE NUMBER STARTING WITH "810"」 |
| 002: | 0441111111: | 192.168.0.1: | 「TELEPHONE NUMBER STARTING WITH "822"」 |
| 000: | | | 「TELEPHONE NUMBER STARTING WITH "0"」 |

FIG. 19

| TELEPHONE NUMBER MANAGEMENT INFORMATION | | |
|---|---|---|
| DEPUTY TELEPHONE NUMBER: | TELEPHONE NUMBER OF TERMINAL TO BE USED | ASSIGNED DATA |
| 050111111: | 09011112222 | 2006/1/9 13:44 |
| 050111112: | 09022223333 | 2006/1/9 13:50 |
| 050111113: | | |

TELEPHONE CONTROL DEVICE, TELEPHONE CONTROL METHOD, TELEPHONE CONTROL PROGRAM, TELEPHONE TERMINAL, TELEPHONE CALLING METHOD, TELEPHONE CALLING PROGRAM AND TELEPHONE CONTROL SYSTEM

TECHNICAL FIELD

The present invention relates to a telephone control device, a telephone control method, a telephone control program, a telephone terminal, a telephone calling method, a telephone calling program and a telephone control system and, more particularly, to a telephone control device, a telephone control method, a telephone control program, a telephone terminal, a telephone calling method, a telephone calling program and a telephone control system enabling direct calling from an outside line telephone to an extension telephone.

BACKGROUND ART

In a company and the like having numbers of extension telephones, telephone transfer devices or operators are used for enabling employees outside the company to make a call to an individual extension telephone from an outside line telephone. In a case, for example, where a telephone transfer device is used, a company disposes the telephone transfer device in an extension telephone network and assigns a representative number to the telephone transfer device.

Upon arrival of an incoming call from the outside line telephone, the telephone transfer device accepts an extension telephone number to be transferred from a caller by using voice response and connects the call to the extension telephone number. With such a mechanism, by calling a representative telephone number to designate an extension telephone number, a person outside the company is allowed to be connected with the extension telephone. When an operator is used, the operator receives an incoming call to a representative telephone. Then, through talking with a caller, accept an extension telephone number to be transferred and connect the call. Furthermore, there is a case where a mechanism is provided for charging a call from an employee outside the company on the company by setting a representative telephone number to be an incoming call charged number.

System in which a telephone transfer device or an operator is disposed, however, has a problem that processing to be executed by a caller might be laborious in a company or the like which has a plurality of extension telephone networks each managing a representative number. There is a case, for example, where a company has a plurality of bases geographically apart from each other, for each of which an extension network is set up and connected by a dedicated line and each extension network has a representative number. In this case, for making a call from an outside line telephone to an extension telephone, a caller needs to select a representative number corresponding to an extension telephone number to be called and make a call. Therefore, for calling an extension number, the caller needs to call a representative number corresponding thereto. Such selective use of a representative number is laborious for the caller.

Literature 1 recites the system having a plurality of private branch exchanges in which numbers of extension telephone terminals are accommodated. In the system, in a case where an incoming call arrives at a certain private branch exchange from outside, when an extension telephone terminal as an arrival destination fails to be accommodated in the private branch exchange, a calling source is notified of a telephone number of a private branch exchange in which the arrival destination is accommodated and an extension number of the extension telephone terminal.

Literature 2 recites a private branch exchange having an incoming number table. In such a private branch exchange, when an incoming call arrives from outside, the call is put to the extension telephone terminal according to the contents set at the incoming number table.

Literature 1: Japanese Patent Laying-Open No. H3-104367 (page 5, FIG. 2)

Literature 2: Japanese Patent Laying Open-No. 2003-78934 (paragraphs 0019-0023, FIG. 3)

According to the systems recited in Literatures 1 and 2, however, in a system including a plurality of private branch exchanges each having a representative number, a caller is not allowed to connect its own telephone terminal to a desired extension telephone terminal by simple operation or the like. In the system recited in Literature 1, a caller needs to newly make a call to a notified representative telephone number. The system recited in Literature 2 enables connection to a desired extension telephone terminal when a private branch exchange is specified. When a plurality of private branch exchanges exist, however, connection to a desired extension telephone terminal accommodated in an arbitrary private branch exchange will be difficult unless some improvement is made.

SUMMARY

An exemplary object of the present invention is to realize a telephone system which enables calling with ease from an outside line to a desired extension telephone terminal in an extension telephone network having a plurality of representative numbers.

An exemplary aspect of the invention, a telephone control device connected to a plurality of telephone terminals and a plurality of telephone exchange devices, includes a designation accepting unit which accepts designation of a calling destination telephone number from a telephone terminal, a connection setting unit which selects a telephone exchange device from the plurality of telephone exchange devices based on a calling destination telephone number accepted by the designation accepting unit to execute connection setting at the selected telephone exchange device so as to connect a call from a telephone terminal which designates the calling destination telephone number to the calling destination telephone number, and a telephone number information transmission unit which transmits telephone number information of a telephone exchange device selected by the connection setting unit to a telephone terminal which designates a calling destination telephone number.

Another exemplary aspect of the invention, a telephone control device connected to a plurality of telephone terminals and a plurality of telephone exchange devices, includes a designation accepting unit which accepts designation of a calling destination telephone number from a telephone terminal, a connection setting unit which selects a telephone exchange device from the plurality of telephone exchange devices based on a calling destination telephone number accepted by the designation accepting unit to instruct an exchange control device incident to the selected telephone exchange device to connect a call from a telephone terminal which designates the calling destination telephone number to the calling destination telephone number, and a telephone number information transmission unit which transmits telephone number information of a telephone exchange device selected by the connection setting unit to a telephone terminal which designates a calling destination telephone number.

Another exemplary aspect of the invention, a telephone control device connected to a plurality of telephone terminals and a plurality of telephone exchange devices, includes a designation accepting unit which accepts designation of a calling destination telephone number upon an incoming call from a telephone terminal, a connection setting unit which selects a telephone exchange device from the plurality of telephone exchange devices based on a calling destination telephone number accepted by the designation accepting unit to execute connection setting at the selected telephone exchange device so as to connect a call from a telephone terminal which designates the calling destination telephone number to the calling destination telephone number, and a call transfer unit which transfers an incoming call from a telephone terminal which designates a calling destination telephone number to a telephone exchange device selected by the connection setting unit.

Another exemplary aspect of the invention, a telephone control method in a telephone control device connected to a plurality of telephone terminals and a plurality of telephone exchange devices, includes a designation accepting step of accepting designation of a calling destination telephone number from a telephone terminal, a selection step of selecting a telephone exchange device from the plurality of telephone exchange devices based on the calling destination telephone number designated by the telephone terminal, a connection setting step of executing connection setting at the selected telephone exchange device so as to connect a call from the telephone terminal which designates the calling destination telephone number to the calling destination telephone number, and a telephone number information transmission step of transmitting telephone number information of the selected telephone exchange device to the telephone terminal which designates the calling destination telephone number.

Another exemplary aspect of the invention, a telephone control method in a telephone control device connected to a plurality of telephone terminals and a plurality of telephone exchange devices, includes a designation accepting step of accepting designation of a calling destination telephone number from a telephone terminal, a selection step of selecting a telephone exchange device from the plurality of telephone exchange devices based on the calling destination telephone number designated by the telephone terminal, a connection setting step of instructing an exchange control device incident to the selected telephone exchange device to connect a call from the telephone terminal which designates the calling destination telephone number to the calling destination telephone number, and a telephone number information transmission step of transmitting telephone number information of the selected telephone exchange device to the telephone terminal which designates the calling destination telephone number.

Another exemplary aspect of the invention, a telephone control method in a telephone control device connected to a plurality of telephone terminals and a plurality of telephone exchange devices, includes a designation accepting step of accepting designation of a calling destination telephone number upon an incoming call from a telephone terminal, a selection step of selecting a telephone exchange device from the plurality of telephone exchange devices based on the calling destination telephone number designated by the telephone terminal, a connection setting step of executing connection setting at the selected telephone exchange device so as to connect a call from the telephone terminal which designates the calling destination telephone number to the calling destination telephone number, and a step of transferring an incoming call from the telephone terminal which designates the calling destination telephone number to the selected telephone exchange device.

Another exemplary aspect of the invention, a telephone controlling program which causes a computer mounted on a telephone control device connected to a plurality of telephone terminals and a plurality of telephone exchange devices, which program makes a computer execute a designation accepting processing of accepting designation of a calling destination telephone number from a telephone terminal, a selection processing of selecting a telephone exchange device from the plurality of telephone exchange devices based on the calling destination telephone number designated by the telephone terminal, a connection setting processing of executing connection setting at the selected telephone exchange device so as to connect a call from the telephone terminal which designates the calling destination telephone number to the calling destination telephone number, and a telephone number information transmission processing of transmitting telephone number information of the selected telephone exchange device to the telephone terminal which designates the calling destination telephone number.

BRIEF DESCRIPTION OF THE DRAWINGS

FIG. 2 is a diagram for use in explaining one example of data stored in a call control information storage unit of the telephone control system according to the first exemplary embodiment of the present invention;

FIG. 3 is a diagram for use in explaining one example of data stored in the call control information storage unit of the telephone control system according to the first exemplary embodiment of the present invention;

FIG. 4 is a diagram for use in explaining one example of data stored in the call control information storage unit of the telephone control system according to the first exemplary embodiment of the present invention;

FIG. 15 is a diagram for use in explaining one example of data stored in a call control information storage unit of the telephone control system according to the fourth exemplary embodiment of the present invention;

FIG. 19 is a diagram for use in explaining one example of data stored in a relay information storage unit of the telephone control system according to the fifth exemplary embodiment of the present invention;

EXEMPLARY EMBODIMENT

Next, exemplary embodiments of the present invention will be described in detail with reference to the drawings.

First Exemplary Embodiment

Figure 1:
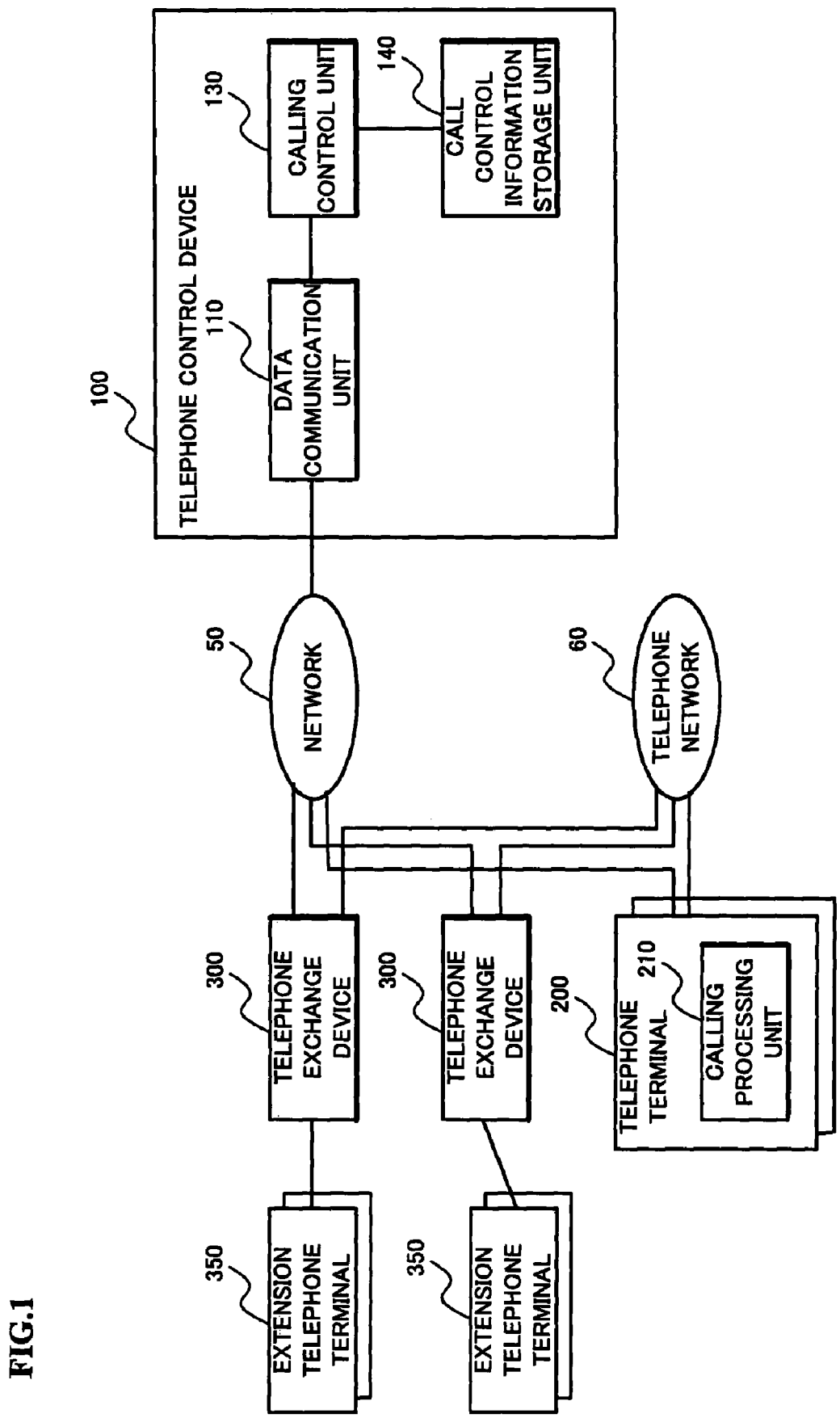
FIG. 1 is a block diagram showing a main part of a structure of a telephone control system according to a first exemplary embodiment of the present invention.

FIG. 1 is a block diagram showing a main part of a structure of a telephone control system according to a first exemplary embodiment of the present invention. The system according to the present exemplary embodiment includes a telephone control device 100, a plurality of telephone terminals 200, a plurality of telephone exchange devices 300, a plurality of extension telephone terminals 350 connected to the telephone exchange devices 300, a network 50 connecting the telephone control device 100, the telephone terminal 200 and the telephone exchange device 300, and a telephone network 60 connecting the telephone terminal 200 and the telephone exchange device 300. Among examples of the network 50 is the Internet. Among examples of the telephone network 60 are public telephone networks including a public fixed telephone network and a public mobile phone network.

The telephone control device 100 includes a data communication unit 110 having a function of communicating with the telephone terminal 200 and the telephone exchange device 300 through the network 50, a calling control unit 130 having a function of processing a calling request from a user, and a call control information storage unit 140 having a function of storing information for use in the processing of the calling control unit 130. Stored in the call control information storage unit 140 are telephone terminal information, telephone exchange device information and call control information. The telephone control device 100 can be realized, for example, by a computer such as a server device or a personal computer. When the telephone control device 100 is realized by a computer, the functions of the calling control unit 130 and the data communication unit 110 (excluding an interface part implemented by hardware) are realized by CPU of a computer which executes control operation according to a program.

The telephone terminal 200 may be a wire telephone terminal (fixed telephone terminal) or a mobile phone terminal.

The telephone terminal 200 has a calling processing unit 210 having a function of executing telephone calling processing in response to a user's request. The calling processing unit 210 has a function of calling the telephone control device 100 and the telephone exchange device 300 through the telephone network 60 and a function of communicating with the telephone control device 100 through the network 50.

The telephone exchange device 300 has a function of managing an extension network including numbers of the extension telephone terminals 350 connected to itself and upon an incoming telephone call from the telephone terminal 200, connecting the call to the extension telephone terminal 350.

Telephone terminal information stored in the call control information storage unit 140 will be described. When the telephone terminal 200 communicates with the telephone control device 100 through the telephone network 60 and the network 50, there occurs a case where the telephone terminal 200 uses other information than a telephone number as its own identification information. Among examples of identification information other than a telephone number are a terminal ID and a manufacturer's serial number inherently assigned to the telephone terminal 200. Telephone terminal information is information for managing a relation between such identification information other than a telephone number and the telephone number of the telephone terminal 200. The telephone control device 100 is capable of identifying a telephone number of the telephone terminal 200 in communication by using telephone terminal information.

FIG. 2 is a diagram for use in explaining an example of telephone terminal information. In the example shown in FIG. 2, included in the telephone terminal information is information about an inherent terminal ID assigned to each telephone terminal 200 and a telephone number of the terminal. The telephone terminal information is stored in advance in the call control information storage unit 140 by a manager of the telephone control device 100 or the like. In a case where in communication with the telephone control device 100, the telephone terminal 200 directly uses a telephone number as its own identification information, telephone terminal information is unnecessary in the telephone control device 100.

Next, telephone exchange device information stored in the call control information storage unit 140 will be described. Telephone exchange device information is information related to a telephone exchange device to be controlled by the telephone control device. The telephone exchange device information includes, with respect to each telephone exchange device, information for identifying a telephone exchange device on the network 50, a representative telephone number assigned to the telephone exchange device, and information about a telephone number of a telephone terminal connected to the telephone exchange device.

FIG. 3 is a diagram for use in explaining an example of telephone exchange device information. In the example shown in FIG. 3, used as information for identifying a telephone exchange device on the network 50 is an IP address. In addition, as information about a telephone number of a connected telephone terminal, condition information related to a telephone number is stored.

Next, call control information stored in the call control information storage unit 140 will be described. Call control information is information related to a call being processed by the telephone control device 100. FIG. 4 is a diagram for use in explaining an example of call control information. In the example shown in FIG. 4, information related to a call includes a telephone number of the telephone terminal 200 requesting a call, a telephone number of a connection destination that the telephone terminal 200 requests (requested telephone number) and an ID of a telephone exchange device corresponding to the requested telephone number.

Figure 5:
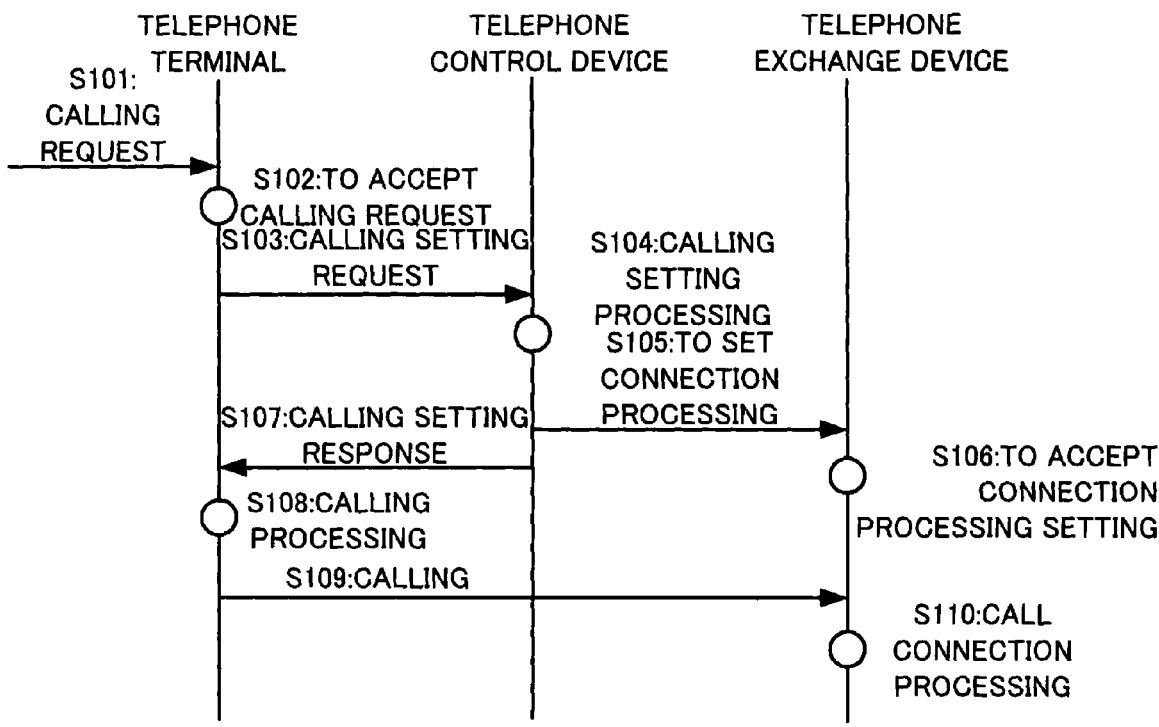
FIG. 5 is a flow chart showing calling processing executed in the telephone control system according to the first exemplary embodiment of the present invention.

Next, operation of the telephone control system according to the present exemplary embodiment will be described with reference to FIG. 5. FIG. 5 is a flow chart showing call control processing at the telephone control system according to the present exemplary embodiment.

First, a user of the telephone terminal 200 requests calling by designating a telephone number through a user interface of the telephone terminal 200, for example, a dial key (Step S101). In the following, a telephone number here designated by a user will be referred to as "requested telephone number".

More specifically, the calling request from the user is accepted at the calling processing unit 210 of the telephone terminal 200 (Step S102). Upon receiving the calling request, the calling processing unit 210 connects to the telephone control device 100 through the network 50 to transmit a request for setting processing for calling (calling setting request) (Step S103). In the calling setting request, the calling processing unit 210 transmits identification information of its own telephone terminal 200 and information of the requested telephone number. The calling setting request is received by the calling control unit 130 through the data communication unit 110 of the telephone control device 100 (Step S104). The calling processing unit 210 of the telephone terminal 200 may connect to the telephone control device 100 through the network 50 via a packet network in the telephone network 60. In this case, a gateway is disposed between the telephone network 60 and the network 50.

Figure 6:
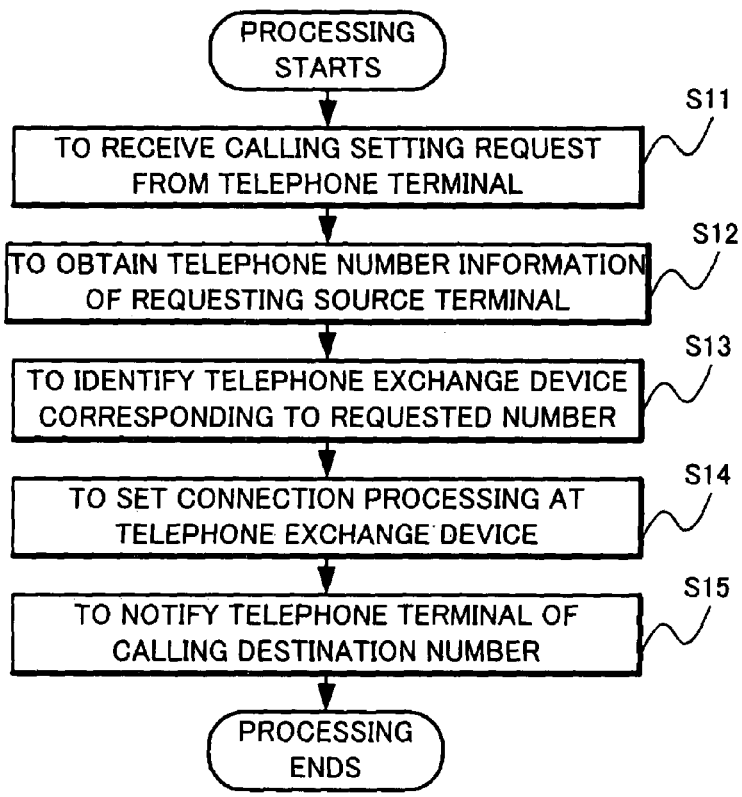
FIG. 6 is a flow chart showing call control processing executed by a calling control unit of the telephone control system according to the first exemplary embodiment of the present invention.

In the following, processing executed by the calling control unit 130 at Step S104 through Step S107 will be described with reference to the flow chart of FIG. 6.

The calling control unit 130 receives a calling setting request from the calling processing unit 210 of the telephone terminal 200 (Step S11). As described above, a calling setting request includes identification information of the telephone terminal 200 as a requesting source and information of a requested telephone number. The calling control unit 130 obtains telephone number information of the telephone terminal 200 as a requesting source by using identification information and telephone terminal information stored in the call control information storage unit 140 (Step S12). The calling control unit 130 may obtain telephone number information by using not telephone terminal information stored in the call control information storage unit 140 but such information as a data base existing outside the telephone control device 100.

Next, the calling control unit 130 identifies the telephone exchange device 300 corresponding to the requested telephone number based on the information stored in the call control information storage unit 140 (Step S13). In a case, for example, where the contents of the telephone exchange device information stored in the call control information storage unit 140 are as shown in the example in FIG. 3 and the requested telephone number is "822727264", the telephone exchange device corresponding to the requested telephone number will be a telephone exchange device whose ID is 002.

The calling control unit 130 stores a combination of the identification information of the telephone exchange device, the requested telephone number and the telephone number of a calling source obtained at Step S12 as call control information of the call control information storage unit 140. The calling control unit 130 may identify a telephone exchange device by using not telephone exchange device information stored in the call control information storage unit 140 but such information as a data base existing outside the telephone control device 100. Among examples of a data base existing outside the telephone control device 100 are a data base which manages a location and a connection state of the telephone terminal 200 and a data base for managing a post of a user of the telephone terminal 200 in an organization.

Next, the calling control unit 130 sets call connection processing at the telephone exchange device 300 (Step S14, Step S105 and Step S106 in FIG. 5). "Setting of call connection processing" here represents processing of setting such that the telephone exchange device 300, upon receiving an incoming call to a representative number from the telephone terminal 200 as a requesting source, connects the call to the requested telephone number. More specifically, the calling control unit 130 gives a call connection instruction to the telephone exchange device 300 through the data communication unit 110 and the network 50 or a communication path separately provided other than the network 50. According to the connection instruction, the telephone exchange device 300 connects the call from the telephone terminal 200 as a requesting source to the requested telephone number. When the private branch exchange APEX series manufactured by NEC Corp. is used as the telephone exchange device 300, a connection instruction can be applied to the telephone exchange device 300 through an OAI (Open Application Interface) mounted on the APEX series.

Figure 7:
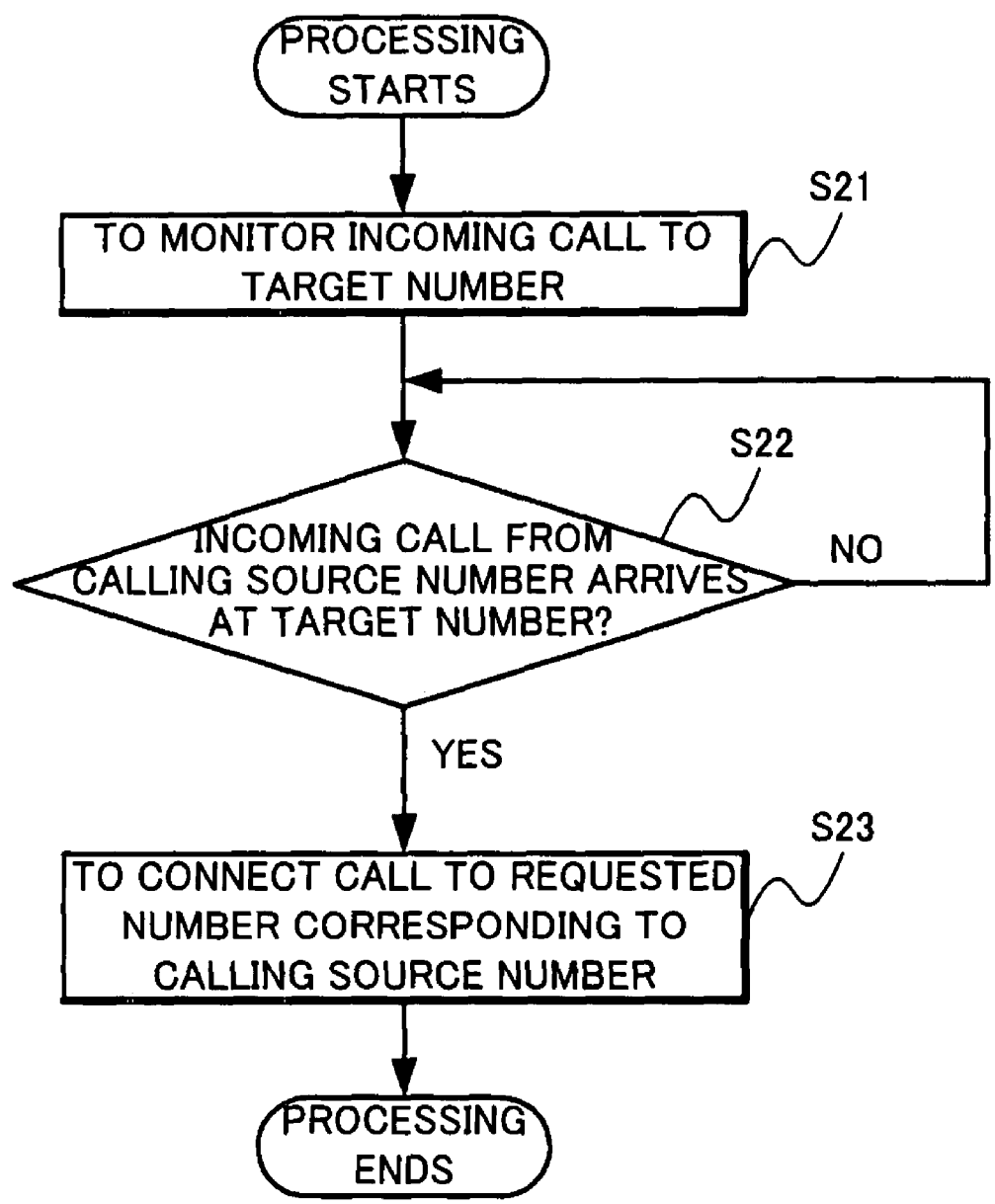
FIG. 7 is a flow chart showing connection setting processing executed in the telephone control system according to the first exemplary embodiment of the present invention.

Setting of call connection processing will be described with reference to the flow chart of FIG. 7. The calling control unit 130 starts monitoring an incoming call to a representative number of the telephone exchange device 300 through the network 50 (Step S21). The calling control unit 130 recognizes arrival of an incoming call from a calling source number to a representative number by, for example, monitoring communication data based on a signal flowing between the telephone network 60 and the telephone exchange device 300 or receiving information indicating that an incoming call arrives from the telephone exchange device 300. Then, wait for an incoming call from the calling source number to occur at the representative number (Step S22). When an incoming call to the representative number from the calling source number occurs, the calling control unit 130 connects the incoming call to the requested telephone number by controlling the telephone exchange device 300 (Step S23). By the foregoing procedure, the calling control unit 130 executes connection processing setting.

After the execution of the processing at Step S14, the calling processing unit 130 notifies the telephone terminal 200 as the requesting source of representative number information of the telephone exchange device 300 identified at Step S13 as a calling setting response through the data communication unit 110 and the network 50 (Step S15, Step S107 in FIG. 5).

Upon receiving the calling setting response from the calling control unit 130, the calling processing unit 210 of the telephone terminal 200 cuts off the connection through the network 50 if necessary to automatically call up the representative telephone number indicated by the calling setting response (Steps S108 and S109). The telephone exchange device 300 connects the call from the telephone terminal 200 to the requested telephone number based on the connection processing setting executed at Steps S105 and S106 (Step S110). The foregoing series of processing at Step S101 through Step S110 realizes connection of a call from the telephone terminal 200 to the requested telephone number based on designation of a user of the telephone terminal 200.

Although a plurality of representative numbers are used in the system, calling is enabled by simple processing of designating only a telephone number to be called (requested telephone number) by a user of the telephone terminal 200 in the execution of the above-described processing.

Figure 8:
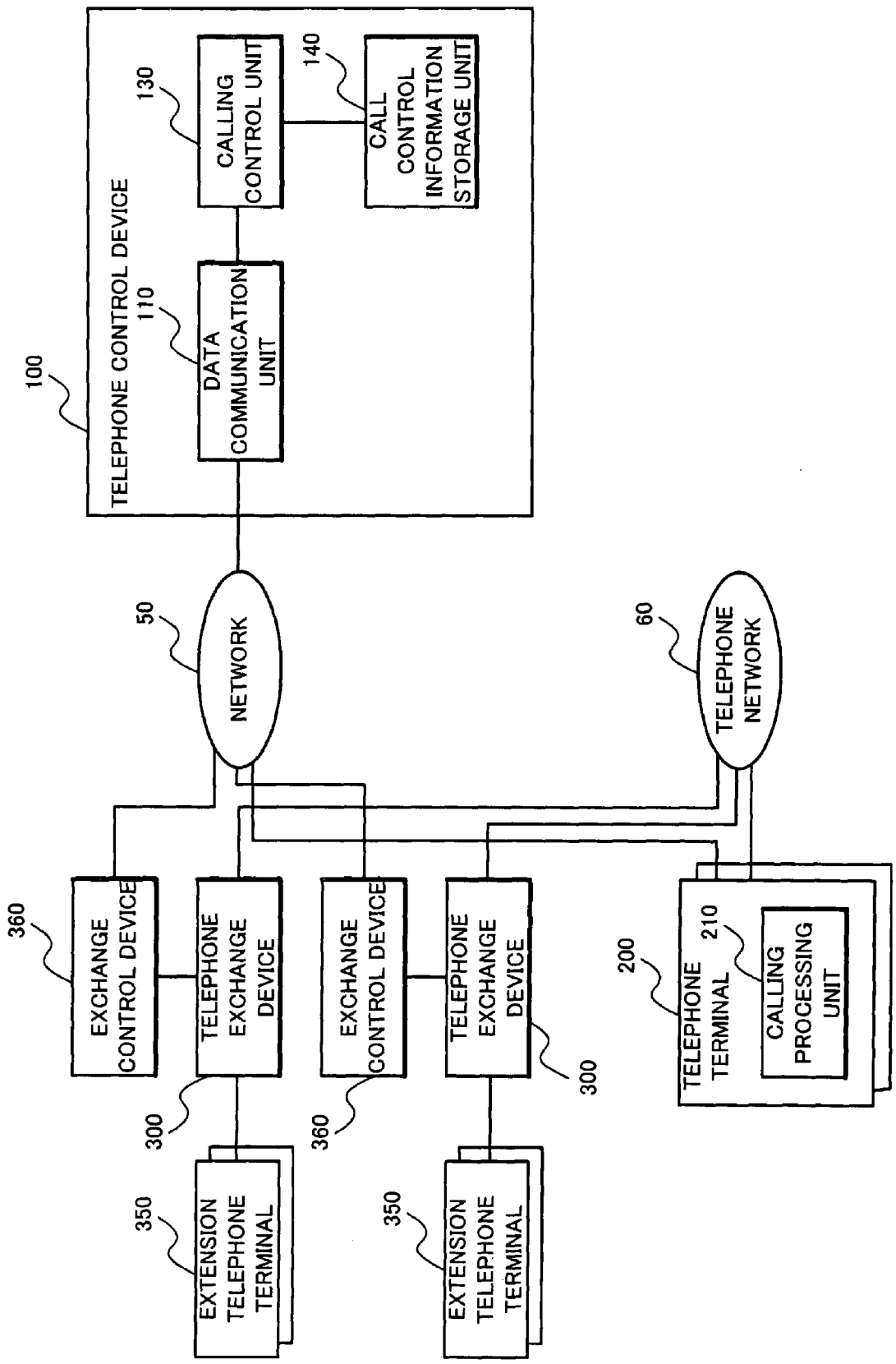
FIG. 8 is a block diagram showing a modification example of the main part of the structure of the telephone control system according to the first exemplary embodiment of the present invention.

In the above-described exemplary embodiment, the processing at Step 105 and Step 106 is executed only by the telephone control device 100. Possible is a structure in which an exchange control device 360 is incident to or contained in each telephone exchange device 300 as shown in FIG. 8. In a case of such a structure, the calling control unit 130 transmits information about a calling source number and a requested telephone number to the exchange control device 360 corresponding to the telephone exchange device 300 as a target of setting and the exchange control device 360 executes processing of Step S21 through S23. In this case, processing loads on the telephone control device 100 can be distributed and control processing through the network 50 can be reduced.

In addition, in the processing at Step S105, a telephone number obtained by converting a requested telephone number by the calling control unit 130 according to predetermined rules may be set as a connection destination. Among examples of conversion are, for example, extraction of lower five digits of a requesting source telephone number, extraction of lower four digits of a requesting source telephone number and conversion based on a specific conversion table. Such conversion enables a call to be properly connected even when, for example, a telephone number system in which the telephone exchange device 300 identifies the extension telephone terminal 350 and a telephone number system of the entire system differ from each other.

In the above-described exemplary embodiment, information of the requested telephone number is transmitted from the telephone terminal 200 to the telephone control device 100 at Step S103. In place of a requested telephone number, identification information for identifying a calling destination (e.g. name, mail address and another telephone number) may be transmitted, so that the calling control unit 130 derives a requested telephone number from the identification information. In this case, the calling control unit 130 has data base information for deriving a requested telephone number from identification information.

When no telephone exchange device corresponding to the requested number exists at Step S13 in the above-described exemplary embodiment, the calling control unit 130 may notify the requested number as it is as a calling destination number at Step S15 without executing the processing at Step S14. Alternatively, as a calling destination number, a number obtained by converting the requested number by predetermined rules may be notified at Step S15.

Second Exemplary Embodiment

Next, a second exemplary embodiment of the present invention will be described.

Figure 9:
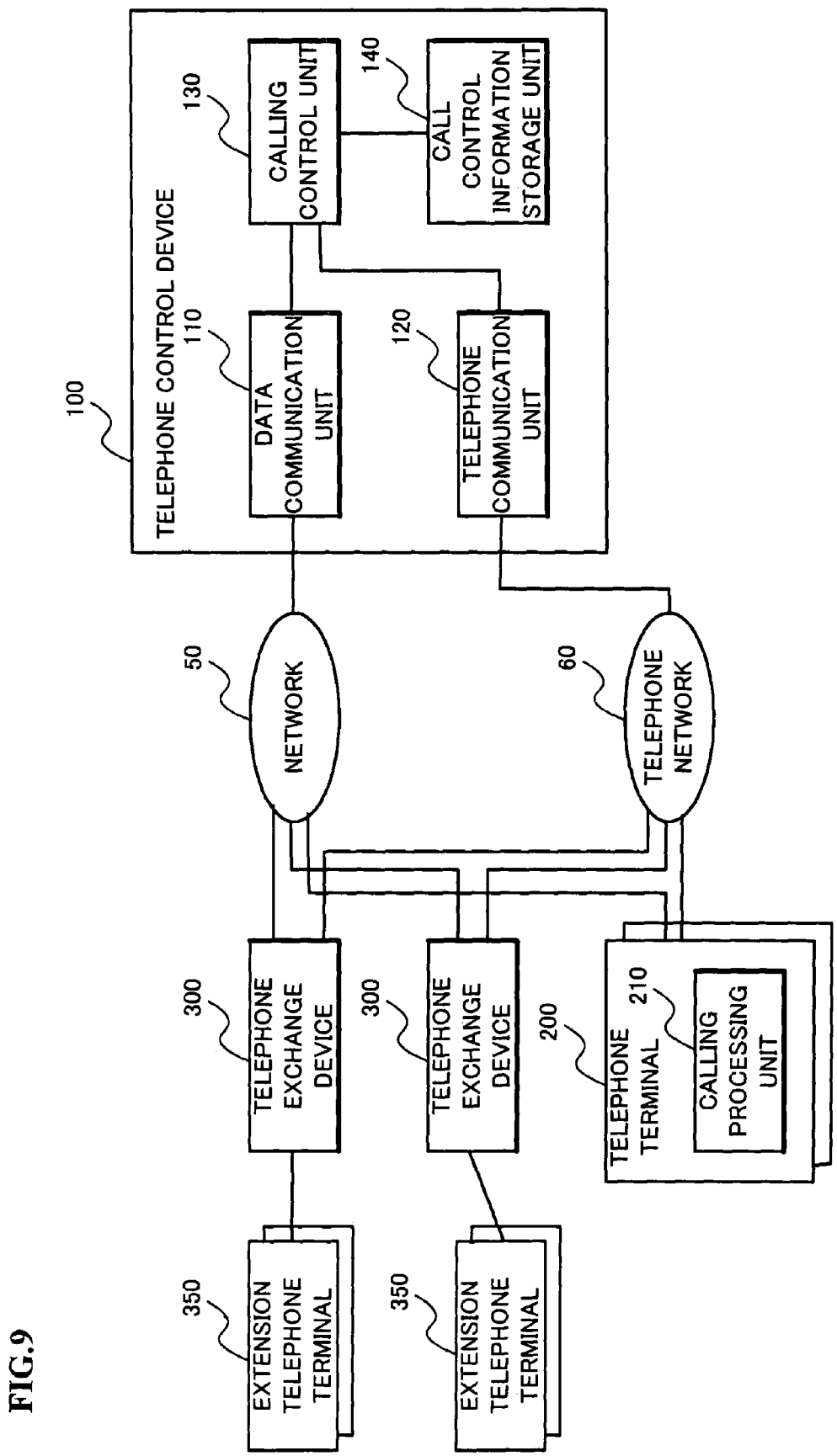
FIG. 9 is a block diagram showing a main part of a structure of a telephone control system according to a second exemplary embodiment of the present invention.

FIG. 9 is a block diagram showing a main part of a structure of a telephone control system according to the second exemplary embodiment of the present invention. The system according to the present exemplary embodiment differs from the structure according to the first exemplary embodiment in adding a telephone communication unit 120 to the telephone control device 100. The telephone communication unit 120 has a function of communicating with the telephone terminal 200 and the telephone exchange device 300 through the telephone network 60.

Figure 10:
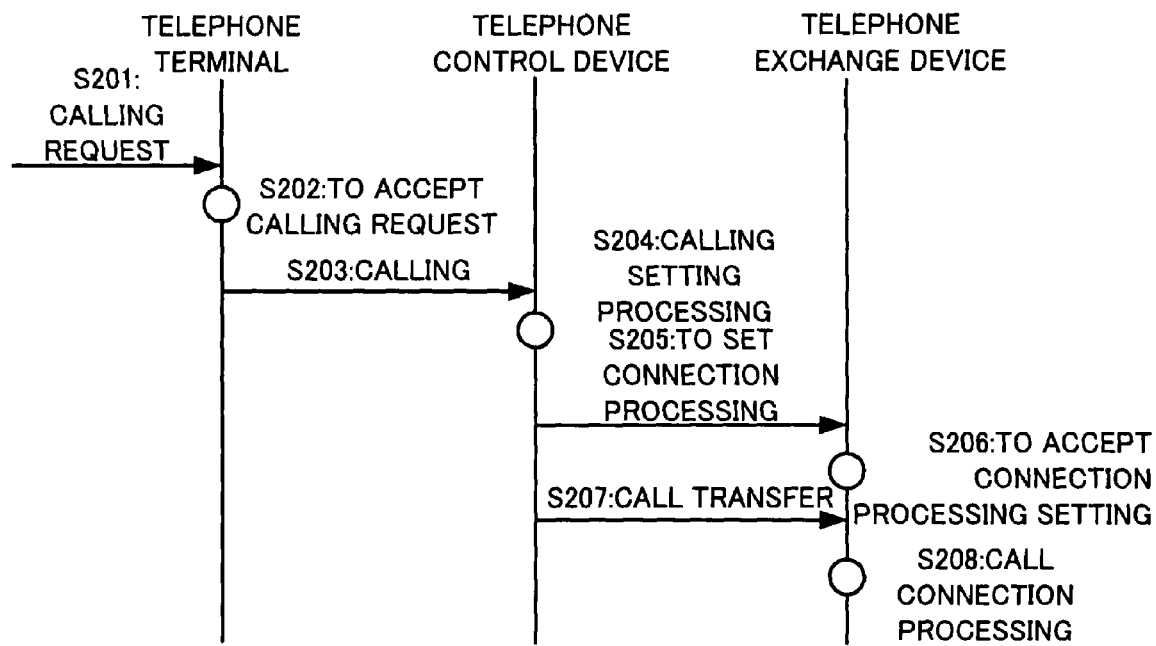
FIG. 10 is a flow chart showing calling processing executed in the telephone control system according to the second exemplary embodiment of the present invention.

Next, operation of the system according to the present exemplary embodiment will be described with reference to FIG. 10. FIG. 10 is a flow chart showing call control processing at the telephone control system according to the preset exemplary embodiment.

First, a user of the telephone terminal 200 designates a telephone number (requested telephone number) to request calling through a user interface of the telephone terminal 200 (Step S201). The calling request from the user is accepted at the calling processing unit 210 of the telephone terminal 200 (Step S202). Upon receiving the calling request, the calling processing unit 210 makes a call to the telephone control device 100 through the telephone network 60 (Step S203). In the present exemplary embodiment, a public telephone number is assigned to the telephone control device 100. In the calling processing unit 210, the telephone number of the telephone control device 100 is stored.

Figure 11:
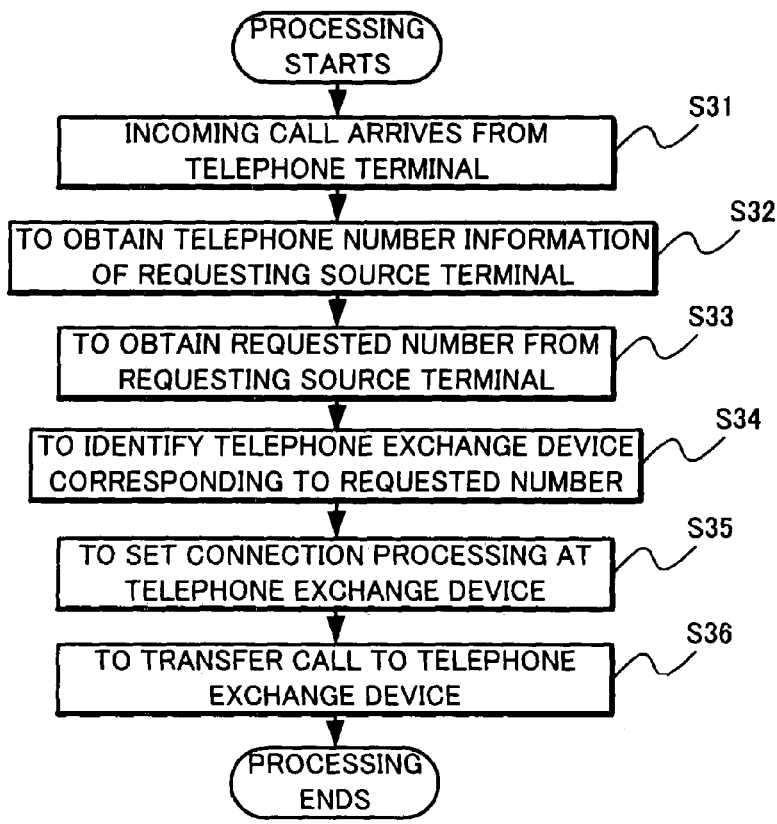
FIG. 11 is a flow chart showing call control processing executed by a calling control unit of the telephone control system according to the second exemplary embodiment of the present invention.

Upon receiving the calling from the telephone terminal 200 through the telephone communication unit 120, the calling processing unit 130 of the telephone control device 100 executes calling setting processing (Step S204). In the following, the processing executed by the calling control unit 130 at Step S204 through Step S207 will be described with reference to the flow chart of FIG. 11.

The calling control unit 130 receives an incoming call from the telephone terminal 200 (Step S31). Next, the calling control unit 130 obtains telephone number information of the telephone terminal 200 (calling source number) (Step S32). Among examples of a method of obtaining a requesting source number is using a caller notification number.

Next, the calling control unit 130 communicates with the calling processing unit 210 through the telephone communication unit 120 and the telephone network 60 to obtain a requested telephone number (Step S33). Next, the calling processing unit 130 identifies the telephone exchange device 300 corresponding to the requested telephone number by the same processing as that of Step S13 in the first exemplary embodiment (Step S34).

Next, the calling processing unit 130 sets call connection processing at the telephone exchange device 300 by the same processing as that of Step S14 in the first exemplary embodiment (Step S35, Step S205 and Step S206 in FIG. 10). Next, the calling processing unit 130 transfers the call from the telephone terminal 200 to a representative number of the telephone exchange device 300 (Step S36, Step 207 in FIG. 10).

In response to the call transfer processing at Step S207, the telephone exchange device 300 connects the call to the requested telephone number based on the connection processing setting executed at Steps S205 and S206 (Step S208). The foregoing series of processing at Step S201 through Step S208 realizes connection of the call from the telephone terminal 200 to the requested telephone number based on designation by the user of the telephone terminal 200.

Also the above-described execution of the processing enables the user of the telephone terminal 200 to make a call by simple processing of designating only a telephone number to be called (requested telephone number) even when a plurality of representative numbers are used in the system.

Third Exemplary Embodiment

Next, a third exemplary embodiment of the present invention will be described.

Figure 12:
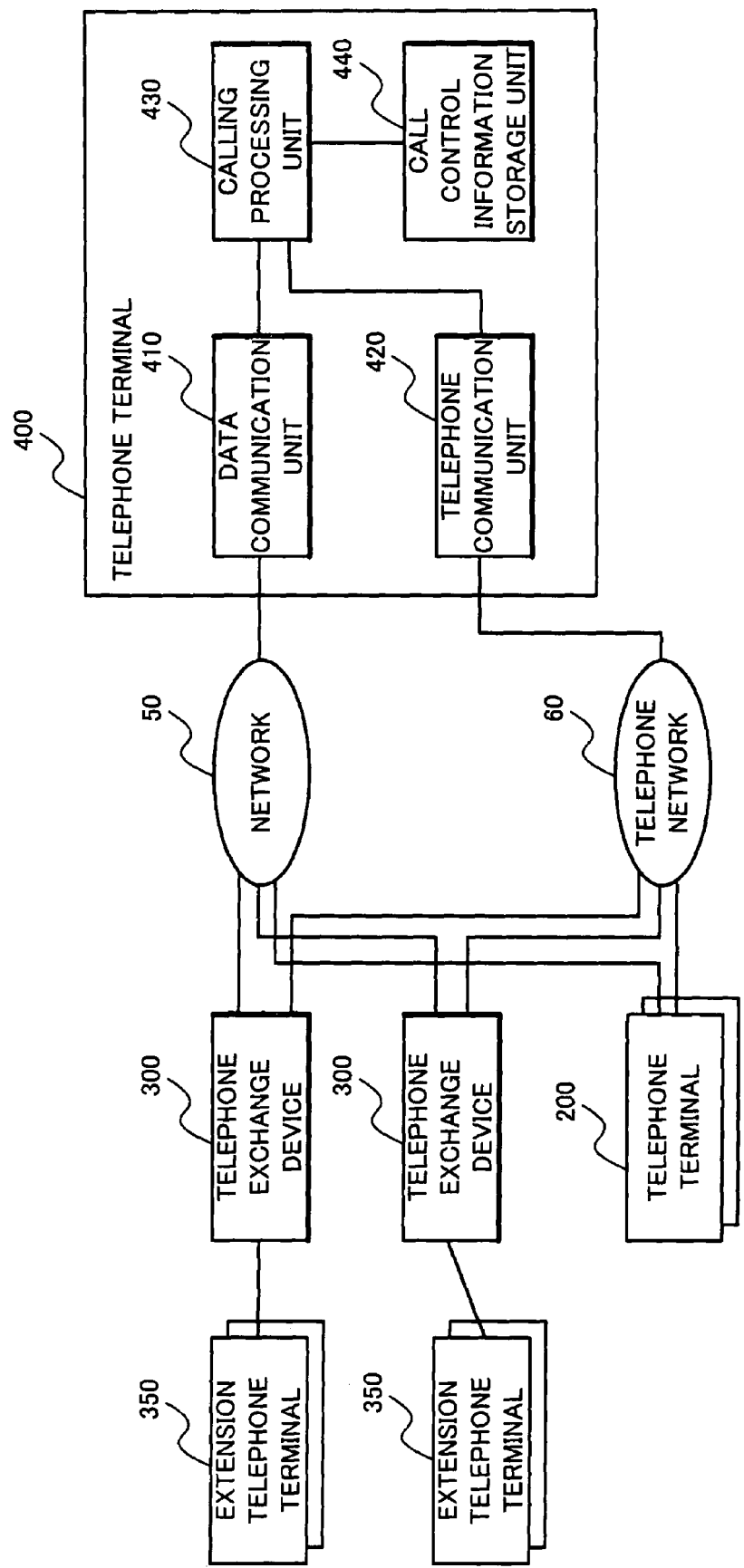
FIG. 12 is a block diagram showing a main part of a structure of a telephone control system according to a third exemplary embodiment of the present invention.

FIG. 12 is a block diagram showing a main part of a structure of a telephone control system according to the third exemplary embodiment of the present invention. The present exemplary embodiment differs from the structure according to the first exemplary embodiment in that a telephone terminal 400 replaces the telephone control device 100. The telephone terminal 400 includes a data communication unit 410 having a function of communicating with the telephone terminal 200 and the telephone exchange device 300 through the network 50, a telephone communication unit 420 having a function of communicating with the telephone terminal 200 and the telephone exchange device 300 through the telephone network 60, a calling processing unit 430 having a function of processing a calling request from a user, and a call control information storage unit 440 having a function of storing information for use in the processing at the calling processing unit 430. Here, stored in the call control information storage unit 440 is the same information as the telephone exchange information stored in the call control information storage unit 140 in the first exemplary embodiment.

Figure 13:
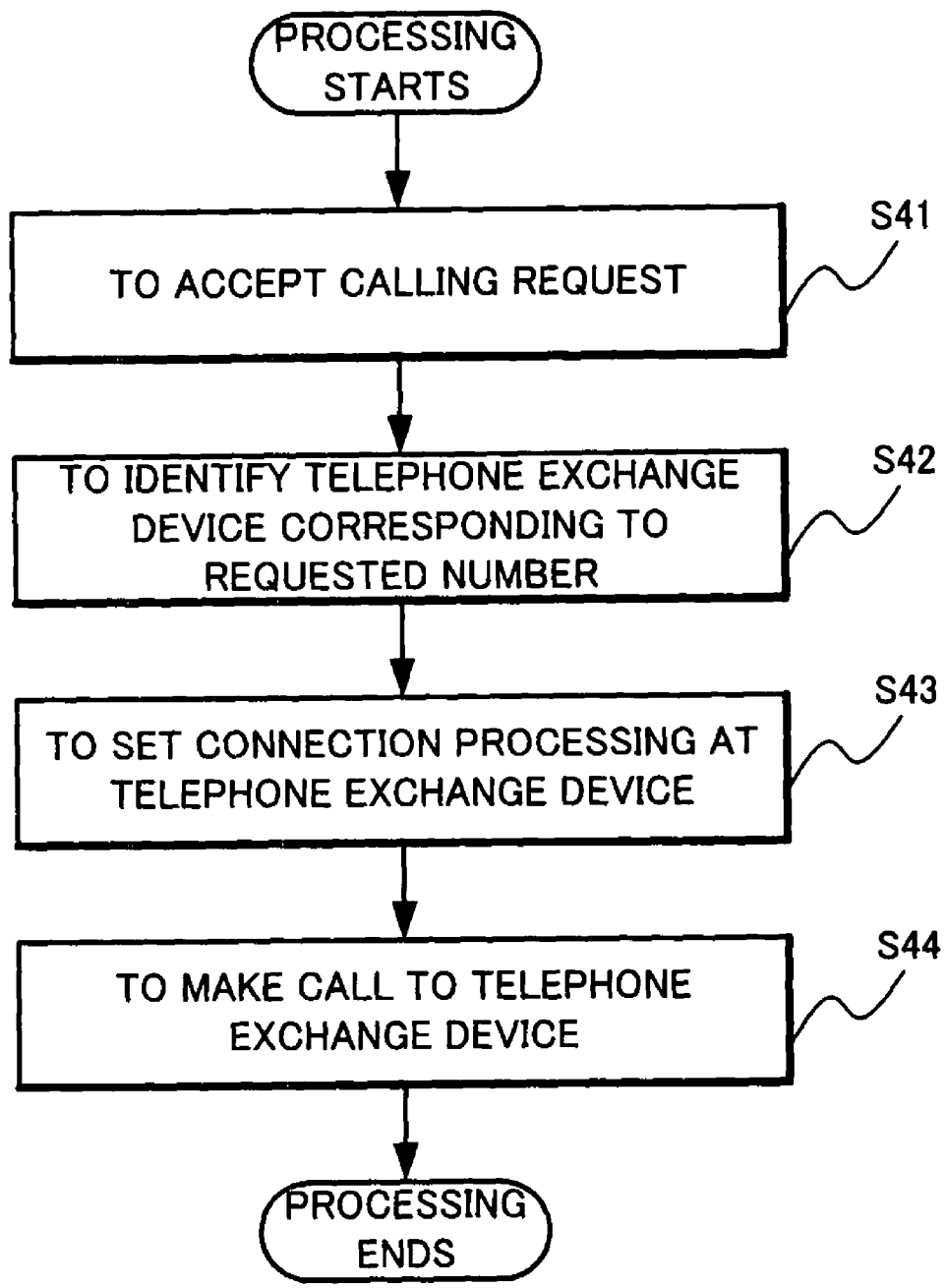
FIG. 13 is a flow chart showing calling processing executed by a calling processing unit of the telephone control system according to the third exemplary embodiment of the present invention.

Next, operation of the system according to the present exemplary embodiment will be described with reference to a flow chart of FIG. 13. FIG. 13 is a flow chart showing call control processing in the telephone control system according to the present exemplary embodiment. The telephone terminal 400 executes the same processing as that of the telephone control device 100 in the second exemplary embodiment.

When a user of the telephone terminal 400 designates a telephone number (requested telephone number) to request calling through the user interface of the telephone terminal 400, the calling processing unit 430 accepts the call (Step S41). Next, the calling processing unit 430 identifies the telephone exchange device 300 corresponding to the requested telephone number by the same processing as that of Step S13 in the first exemplary embodiment (Step S42).

Next, the calling processing unit 430 sets call connection processing at the telephone exchange device 300 by the same processing as that executed by the calling control unit 130 at Step S14 in the first exemplary embodiment (Step S43). Lastly, the calling processing unit 430 makes a call to the representative number of the telephone exchange device 300 (Step S44).

The telephone exchange device 300 having received the call from the calling processing unit 430 connects the call to the requested telephone number based on the connection processing setting executed at Steps S43. The foregoing series of processing realizes connection of the call from the telephone terminal 400 to the requested telephone number based on the designation by the user of the telephone terminal 400.

Also the above-described execution of the processing enables the user of the telephone terminal 400 to make a call by simple processing of designating only a telephone number to be called (requested telephone number) even when a plurality of representative numbers are used in the system.

The telephone terminal 400 includes all the functions of the telephone control device 100 according to the second exemplary embodiment. The calling control unit 430 accordingly functions in the same manner as that of the calling control unit 130 in the second exemplary embodiment. More specifically, control can be also executed such that a telephone exchange device is selected based on a requested telephone number from the telephone terminal 200 to execute connection setting at the selected telephone exchange device so as to connect a call from the telephone terminal 200 with the requested telephone number designated to the requested telephone number and transfer the incoming call from the telephone terminal 200 to the selected telephone exchange device. In addition, the telephone terminal 400 includes CPU, and the function of the calling control unit 430 and the function of the data communication unit 410 (excluding an interface part implemented by hardware) are realized by CPU which executes control operation according to a program.

Fourth Exemplary Embodiment

Next, a fourth exemplary embodiment of the present invention will be described.

The fourth exemplary embodiment differs from the first exemplary embodiment in having two stages of telephone exchange devices connected in series. This is premised on a case where, for example, an owner of a connected telephone exchange device differs. It is a case, for example, where with a telephone exchange device which first receives a call from the terminal 200 as a first-stage telephone exchange device and a telephone exchange device which receives a call from the terminal 200 through the first-stage telephone exchange device as a second-stage telephone exchange device, the first-stage telephone exchange device is owned by a public telephone exchange provider and the second-stage telephone exchange device is owned by a corporation.

At this time, the case where a telephone exchange device owned by a public telephone exchange provider is always used occurs, for example, when use of additional service related to voice communication provided by the public telephone exchange provider is required. For example, use of incoming call charging service or economical telephone communication service is required.

In this case, although all the calls will be first sent to the first-stage telephone exchange device, call processing executed at this time after the first-stage telephone exchange device have two types. One is a case where a call from the terminal 200 is sent from the first-stage telephone exchange device directly to a terminal having a requested telephone number designated by a user of the terminal 200 and the other is a case where after passing through the first-stage telephone exchange device and then the second-stage telephone exchange device, a call is sent to a terminal having a requested telephone number designated by the user of the terminal 200.

As a division into these two cases, there is a case, for example, where a requested telephone number is a number of a terminal connected to a public telephone network or an extension number connected to a company's own network. In this example, possible is directly sending a call from the first-stage telephone exchange device to a terminal having a requested telephone number when the requested telephone number is the number of a terminal of a public telephone network and, sending a call through the second-stage telephone exchange device when the same is an extension number.

Figure 14:
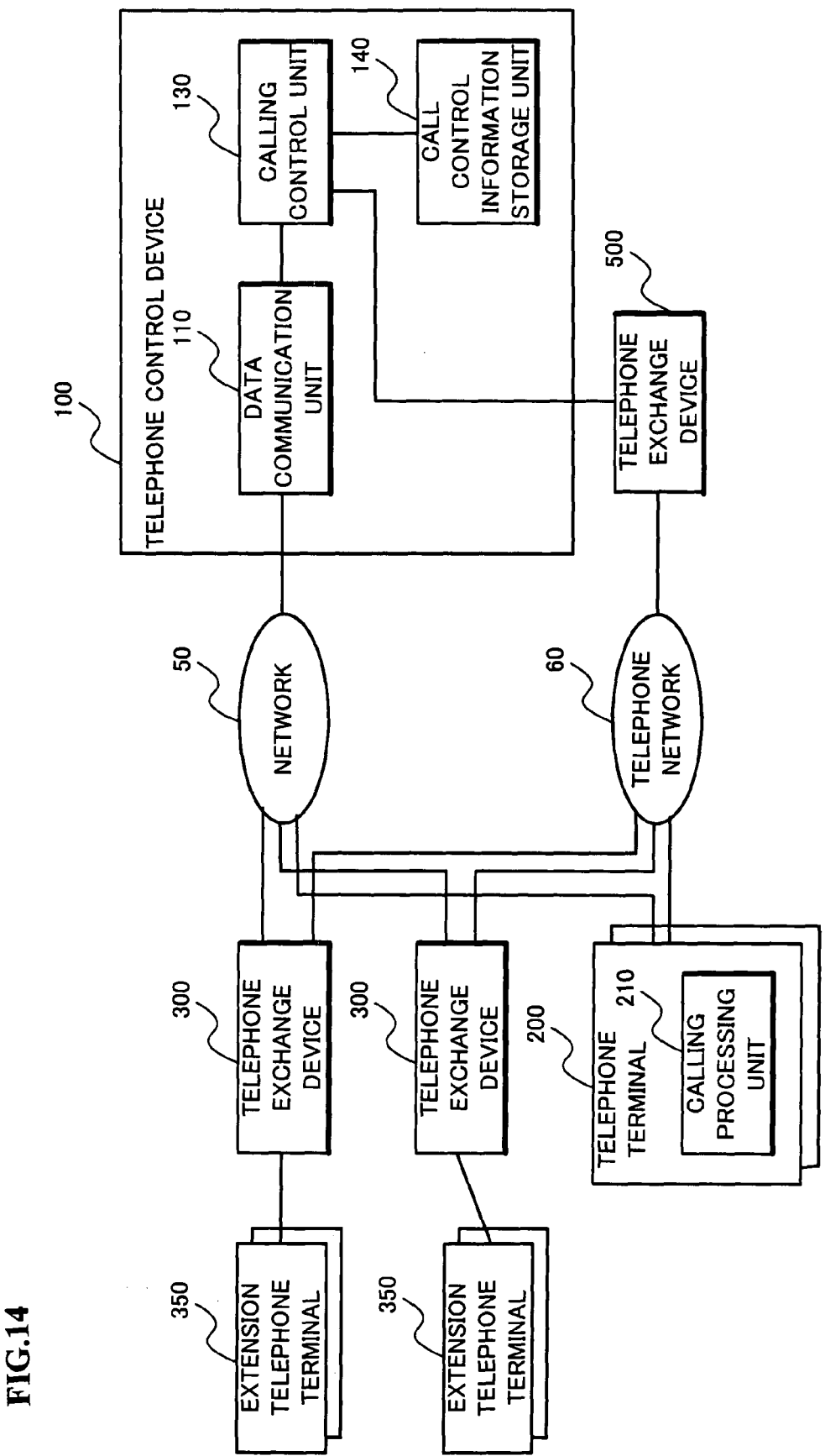
FIG. 14 is a block diagram showing a main part of a structure of a telephone control system according to a fourth exemplary embodiment of the present invention.

FIG. 14 is a block diagram showing a main part of a structure of a telephone control system according to the fourth exemplary embodiment of the present invention. The system according to the present exemplary embodiment differs from the structure of the first exemplary embodiment only in adding a telephone exchange device 500 at the first stage. The first-stage telephone exchange device 500 connects to the telephone network 60 and has a communication line for communicating with the calling control unit 130 of the telephone control device 100. The network 50 may be used for the present line.

Telephone exchange device information held by the calling control unit 130 for controlling the telephone exchange device 500 differs in form from the first exemplary embodiment. Example of the telephone exchange device information is shown in FIG. 15.

The telephone exchange device information is formed of a plurality of pieces of information with four kinds of contents, a telephone exchange device ID, a representative telephone number, a telephone exchange device address and a corresponding telephone number as a set. The telephone exchange device ID is for identifying the second-stage telephone exchange device 300. As the already described example, however, with some requested number, there occurs a case where a call is transmitted from the first-stage telephone exchange device 500 to a terminal of the requested telephone number without passing through the second-stage telephone exchange device 300. Such a case will be hereinafter referred to as "a case where no second-stage telephone exchange device exists corresponding to a requested telephone number". In the telephone exchange device information in this example, when there exits no second-stage telephone exchange device 300 corresponding to a requested telephone number, the telephone exchange device ID is set to be 000. In other words, the difference from the first exemplary embodiment is that telephone exchange device information includes a case where the telephone exchange device 300 is not used.

The telephone exchange device 500 has a function of accepting and transferring a telephone call and has one telephone number for accepting the telephone call. Telephone number information of the telephone exchange device 500 is also held by the calling control unit 130. When there is a call, the telephone exchange device 500 confirms a caller's number of the call and transfers a voice call according to an instruction of the calling control unit 130. At this time, the telephone exchange device 500 changes the caller's number to a transfer destination based on the instruction from the calling control unit 130.

Figure 16:
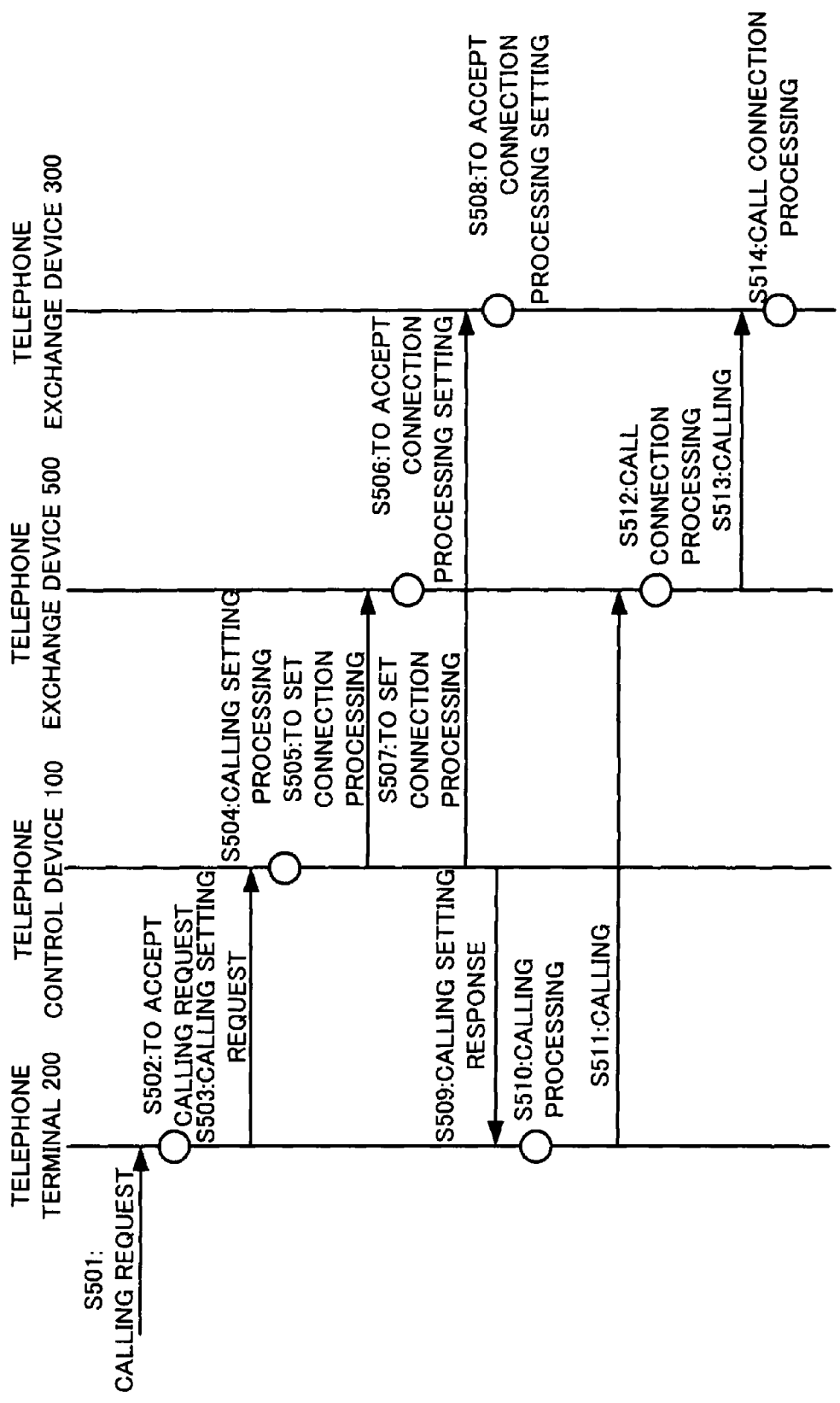
FIG. 16 is a flow chart showing calling processing executed in the telephone control system according to the fourth exemplary embodiment of the present invention.

Operation of the entire system of the present exemplary embodiment will be described with reference to FIG. 16. FIG. 16 is a flow chart showing call control processing in the telephone control system according to the present exemplary embodiment.

First, a user of the telephone terminal 200 requests calling by designating a telephone number (requested telephone number) through a user interface of the telephone terminal 200 (Step S501). The calling request from the user is accepted by the calling processing unit 210 of the telephone terminal 200 (Step S502). Upon receiving the calling request, the calling processing unit 210 connects to the telephone control device 100 through the network 50 to transmit a request for setting of processing for calling (calling setting request) (Step S503). In the calling setting request, the calling processing unit 210 transmits identification information of the telephone terminal 200 itself and information about the requested telephone number. The calling setting request is received by the calling control unit 130 through the data communication unit 110 of the telephone control device 100 (Step S504). The calling processing unit 210 of the telephone terminal 200 may be connected to the telephone control device 100 through the network 50 via a packet network in the telephone network 60. In this case, a gateway will be disposed between the telephone network 60 and the network 50.

Figure 17:
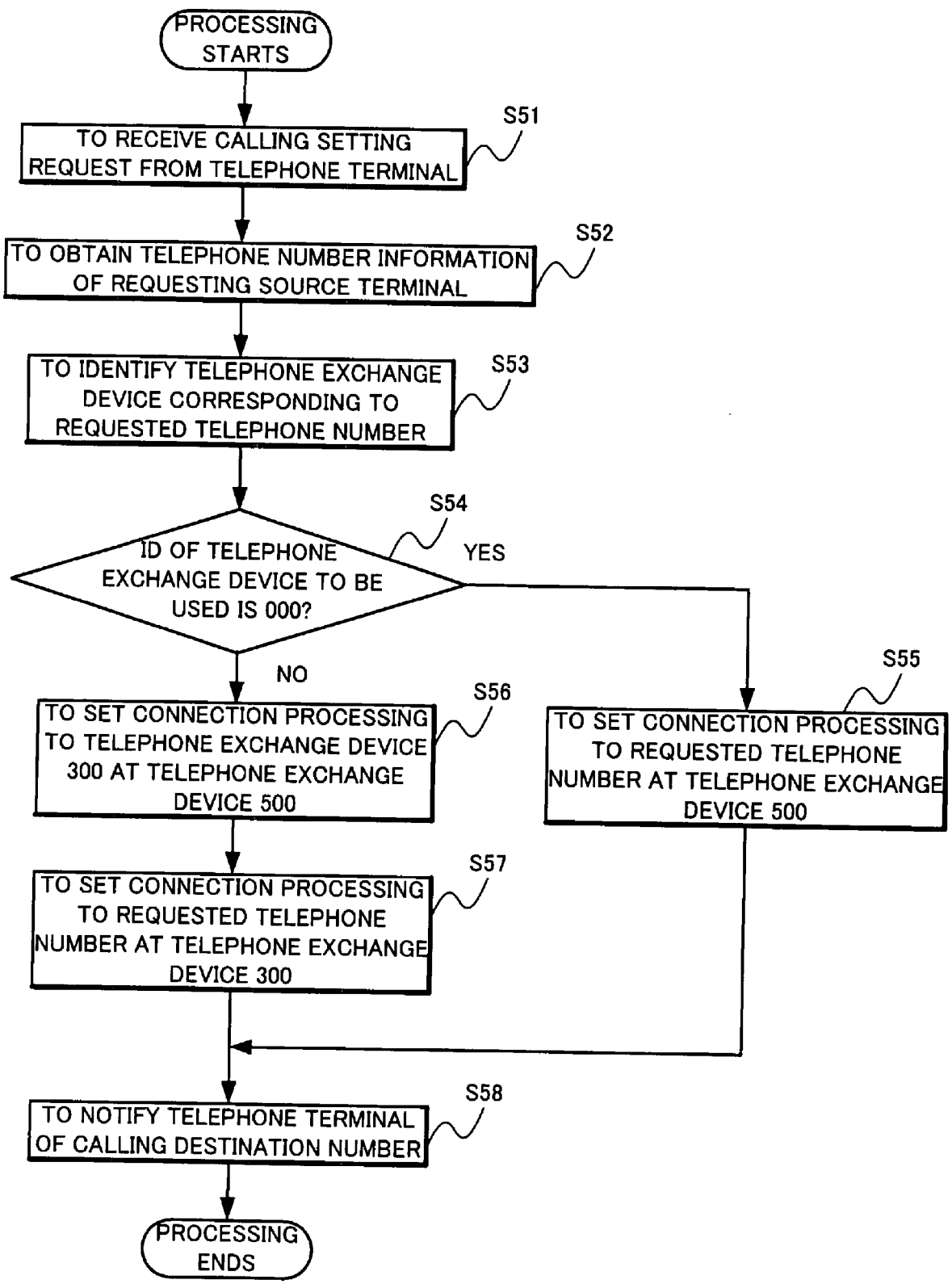
FIG. 17 is a flow chart showing call control processing executed by a calling control unit of the telephone control system according to the fourth exemplary embodiment of the present invention.

In the following, description will be made of processing executed by the calling control unit 130 at Step S504 through Step S509 with reference to the flow chart of FIG. 17.

The calling control unit 130 receives a calling setting request from the calling processing unit 210 of the telephone terminal 200 (Step S51). As described above, the calling setting request includes the identification information of the telephone terminal 200 as a requesting source and information about a requested telephone number. The calling control unit 130 obtains telephone number information of the telephone terminal 200 as a requesting source by using the identification information and the telephone terminal information stored in the call control information unit 140 (Step S52). The calling control unit 130 may obtain telephone number information by using not the telephone terminal information stored in the call control information storage unit 140 but such information as a data base existing outside the telephone control device 100.

Next, based on the information stored in the call control information storage unit 140, the calling control unit 130 identifies the telephone exchange device 300 corresponding to the requested telephone number (Step S503). When the contents of the telephone exchange device information stored in the call control information storage unit 140 are as shown in the example illustrated in FIG. 15 and the requested telephone number is "82272764", for example, the telephone exchange device 300 corresponding to the requested telephone number will be the telephone exchange device 300 whose telephone exchange device ID is 002. On the other hand, when the requested telephone number is "0441112222", the telephone exchange device ID corresponding to the requested telephone number will be 000. As is described above, the telephone exchange device ID being 000 indicates that there exists none of the corresponding telephone exchange device 300.

Here, the calling control unit 130 may identify a telephone exchange device by using not telephone exchange device information stored in the call control information storage unit 140 but such information as a data base existing outside the telephone control device 100. Among examples of a data base existing outside the telephone control device 100 are a data base for managing a location and a connection state of the telephone terminal 200 and a data base for managing a function of a user of the telephone terminal 200 in an organization.

Next, while the calling control unit 130 sets call relay processing at the telephone exchange device 500 (Step S505 and Step S506 in FIG. 16), at the setting, processing is branched according to the value of the telephone exchange device ID specified at Step S53. Here, "setting of call connection processing" is processing by the telephone exchange device 500 of, upon receiving an incoming call to the telephone number of the telephone exchange device 500 from the telephone terminal 200 as a requesting source, setting the call to be connected to a transfer destination telephone number obtained at the time of "setting of call connection processing". More specifically, the calling control unit 130 gives a "setting of call connection processing" instruction to the telephone exchange device 500 through the data communication unit 110 and the network 50 or through a communication path separately provided other than the network 50. According to the setting instruction, the telephone exchange device 500 executes setting such that the call from the telephone terminal 200 as a requesting source is connected to the transfer destination telephone number. Information transferred by the calling control unit 130 to the telephone exchange device 500 in the setting of this call connection processing has two kinds. One is a telephone number of the telephone terminal 200 as a requesting source and the other is a transfer destination telephone number.

Condition for determining whether processing is to be branched or not is whether the telephone exchange device ID specified at Step S53 is 000 or not (Step S54). When the telephone exchange device ID specified at Step S53 is 000, the calling control unit 130 sets call connection processing at the telephone exchange device 500 by using the requested telephone number as a transfer destination telephone number (Step S55). When the requested telephone number is "0441112222", for example, since the telephone exchange device ID corresponding to the requested telephone number is 000, the requested telephone number "0441112222" is as it is transmitted as a transfer destination telephone number to the telephone exchange device 500.

When the telephone exchange device ID of the telephone exchange device corresponding to the requested telephone number at Step S53 is other than 000, the calling control unit 130 sets call connection processing at the telephone exchange device 500 with a representative telephone number corresponding to the telephone exchange device as a transfer destination telephone number according to the telephone exchange device information preserved in the call control information storage unit 140 (Step S56). In a case, for example, where the example of FIG. 15 is used as telephone exchange device information, if the requested telephone number is "82272764", the telephone exchange device 300 corresponding to the requested telephone number will be the telephone exchange device 300 whose telephone exchange device ID is 002, so that the representative telephone number "04411111111" is transmitted to the telephone exchange device 500 as a transfer destination telephone number.

After the execution of the processing at Step S56, the calling processing unit 130 further sets call connection processing at the telephone exchange device 300 (Step S57, Steps 507 and 508 in FIG. 16). In the processing at the present step, upon receiving an incoming call at the telephone exchange device 300 from the telephone terminal 200 as a requesting source, the calling processing unit 130 executes setting such that the call is connected to the requested telephone number.

After the processing at Step S55 or S57, the calling processing unit 130 notifies the telephone terminal 200 as a requesting source of the telephone number of the telephone exchange device 500 as a calling setting response through the data communication unit 110 and the network 50 (Step S58, Step S509 in FIG. 16).

Upon receiving the calling setting response from the calling control unit 130, the calling processing unit 210 of the telephone terminal 200 cuts off the connection through the network 50 if necessary and automatically makes a call to the telephone number of the telephone exchange device 500 indicated by the calling setting response (Step S510, S511). At this time, by the function that the telephone terminal 200 has, a calling confirmation screen might be displayed for a user.

The telephone exchange device 500 having received the call from the telephone terminal 200 connects the call from the telephone terminal 200 to the call exchange device 300 or directly to the requested telephone number based on the connection processing setting executed at Steps S505 and S506 (Steps S512 and S513). FIG. 16 shows an example where the connection is established through the telephone exchange device 300, which is a case where determination is made to use the telephone exchange device 300 at the determination processing at Step S55.

In this case, the telephone exchange device 500 connects to the telephone exchange device 300, and the telephone exchange device 300 further connects the call from the telephone terminal 200 through the telephone exchange device 500 to the requested telephone number based on the connection processing setting executed at Steps S507 and S508 (Step S514).

The foregoing series of processing at Steps S501 through S514 realizes connection of a call from the telephone terminal 200 to the requested telephone number based on the designation of the user of the telephone terminal 200.

The above-described execution of the processing enables the user of the telephone terminal 200 to make a call by simple processing of designating only a telephone number to be called (requested telephone number) even when a plurality of representative numbers are used in the system. In addition, in a case, for example, where the telephone exchange device 300 is owned by a corporation and the telephone exchange device 500 is owned by a telephone service provider, since to the telephone exchange device owned by the corporation, only a call to the corporation is connected to the telephone exchange device owned by the corporation, loads on the telephone exchange device owned by the corporation can be mitigated.

In the above-described exemplary embodiment, the processing at Steps S505 and S506 or at Steps S507 and S508 is executed only by the telephone control device 100. Similarly to the example of FIG. 8 according to the first exemplary embodiment, however, adoptable is a structure in which the exchange control device 360 is incident to each telephone exchange device 300 shown in FIG. 8 or a structure in which the same is contained. In a case of such a structure, the calling control unit 130 transmits information about a calling source number and a requested telephone number or information about a representative telephone number of the telephone exchange device 300 to the telephone exchange device 300 as a setting target or to the exchange control device 360 corresponding to the telephone exchange device 500, and the exchange control device 360 executes the processing of Steps S21 through S23 in FIG. 7. In this case, processing loads on the telephone control device 100 can be distributed to reduce control processing executed through the network 50.

As a modification example of the present exemplary embodiment, the setting processing of connection to the first-stage telephone exchange device 500 at Step S505 can be executed simultaneously with calling processing from the telephone terminal 200 at Step S511. In this case, at Step S55 in FIG. 17, in place of setting the connection processing to a requested telephone number at the telephone exchange device 500, generate a telephone number for requesting a call to the requested telephone number through the telephone exchange device 500 and notify the telephone terminal of the generated telephone number at Step S58.

Possible method of generating the telephone number is setting a requested telephone number at the telephone number of the telephone exchange device 500 as a sub-address, for example. Assume that the telephone number of the telephone exchange device 500 is "050111111" and the requested telephone number is "0311111111", link these numbers by an identifier "*" indicative of a sub-address to make "05111111*0311111111". At this time, the telephone terminal 200 makes a call to the telephone exchange device 500 with information of a sub-address and the telephone exchange device 500 having received it confirms the sub-address and transfers the call to the requested telephone number.

Other possible method of generating a telephone number is linking a special telephone number prefix before the requested telephone number which prefix indicates that the call will be transferred through the telephone exchange device 500. More specifically, with the special prefix "0001" in the example having the same number as the above, link the prefix before the requested telephone number to make "00010311111111". At this time, while the telephone terminal 200 makes a call directed to the number with the special prefix at Step S511, the telephone service provider side connects the call to the telephone exchange device 500 while identifying the prefix, and the telephone exchange device 500 recognizes the requested telephone number with the prefix excluded to transfer the call to the requested telephone number.

Although this operation is premised on a case where a call is connected from the telephone exchange device 500 directly to the requested telephone number as an example, call transfer through the telephone exchange device 300 can be similarly realized by generating a telephone number including the telephone number of the telephone exchange device 300 and notifying the telephone terminal 200 of the same at Step S58 in place of setting connection processing to the telephone exchange device 300 at Step S56.

Fifth Exemplary Embodiment

Fifth exemplary embodiment of the present invention will be described next.

In the present exemplary embodiment, in place of the first-stage telephone exchange device 500 in the fourth exemplary embodiment, a telephone relay device 600 is used. The telephone relay device 600 has a function of connecting a call from the telephone terminal 200 to the telephone exchange device 300 or a terminal having another designated telephone number similarly to the first-stage telephone exchange device 500 and a function of notifying the telephone exchange device 300 as a connection destination of not the number of the telephone terminal 200 but a replacing telephone number (deputy telephone number) as a caller number to hide the number of the telephone terminal 200.

Figure 18:
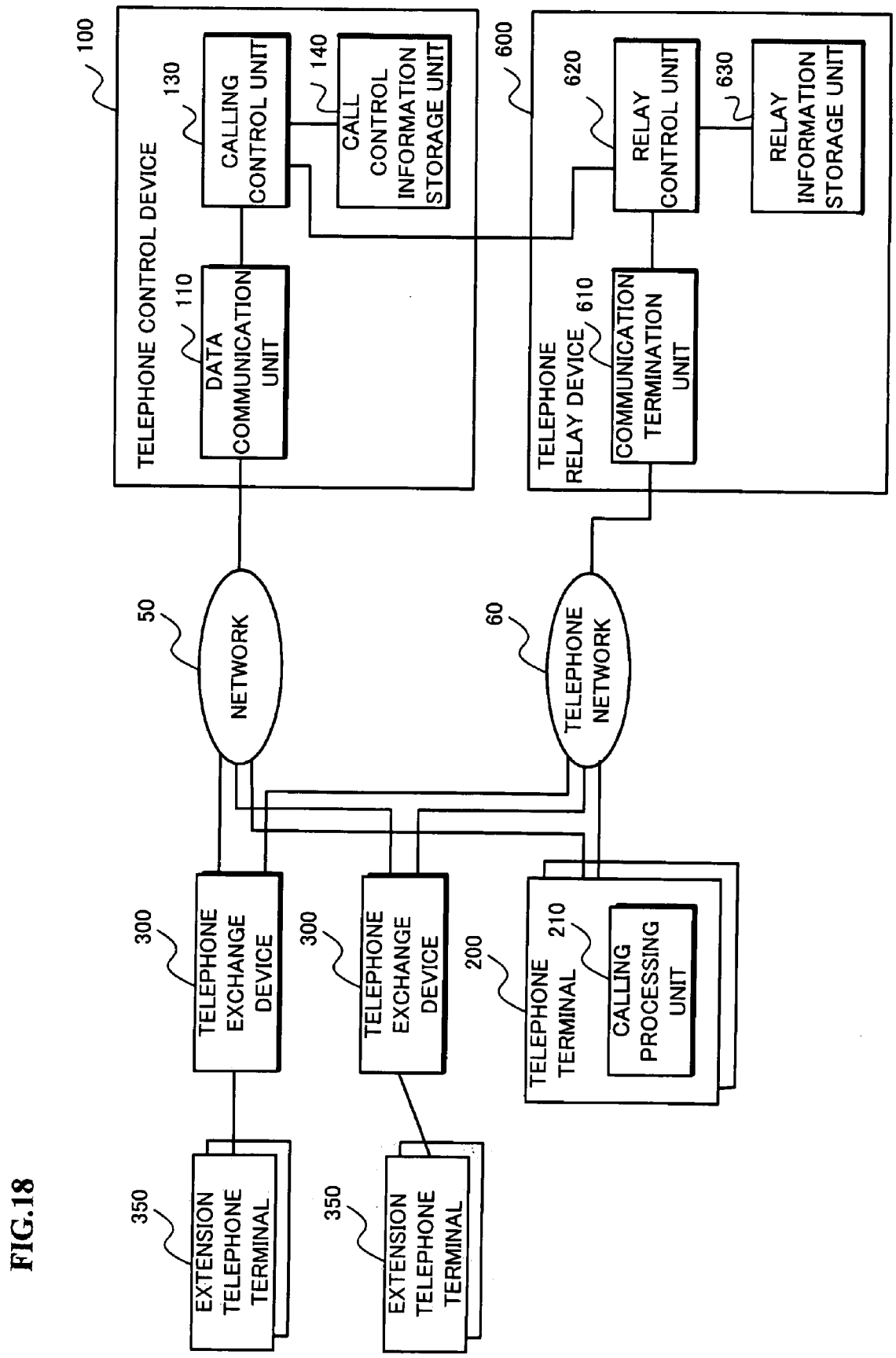
FIG. 18 is a block diagram showing a main part of a structure of a telephone control system according to a fifth exemplary embodiment of the present invention.

FIG. 18 is a block diagram showing a main part of a structure of a telephone control system according to the fifth exemplary embodiment of the present invention. The system according to the present exemplary embodiment differs from the structures according to the first and fourth exemplary embodiments in that the telephone relay device 600 is added or disposed in place of the telephone exchange device 500. The telephone relay device 600 connects to the telephone network 60, as well as having a communication line for communicating with the calling control unit 130 of the telephone control device 100. The network 50 may be used in place of the present line.

Telephone exchange device information held by the calling control unit 130 for controlling the telephone relay device 600 is the same as that of the fourth exemplary embodiment. More specifically, an example of the telephone exchange device information is as shown in FIG. 15. The telephone exchange device information is formed of a plurality of pieces of information with four kinds of contents, a telephone exchange device ID, a representative telephone number, a telephone exchange device address and a corresponding telephone number as a set. While the telephone exchange device ID is for identifying the telephone exchange device 300, the telephone exchange device ID being 000 in this example represents that none of the corresponding telephone exchange device 300 exists.

While the telephone relay device 600 has a function of accepting and transferring a call, the device notifies a transfer destination of not a telephone number of a calling source device but a deputy telephone umber managed by the telephone relay device 600 by once terminating the call. When executing the operation, the telephone relay device 600 has one telephone number for accepting the call. Telephone number information of the telephone relay device 600 is also held by the calling control unit 130. Upon an incoming call, the telephone relay device 600 confirms a caller's number of the call and transfers a voice call based on an instruction of the calling control unit 130. At this time, the telephone relay device 600 changes the caller's number for the transfer destination based on the instruction of the calling control unit 130. The telephone relay device 600 also holds the telephone number of the calling source and information corresponding to the deputy telephone number in the relay information storage unit 630.

Example of the telephone number management information is shown in FIG. 19. Here, for a telephone set having a telephone number "09011112222", for example, a deputy telephone number "050111111" is held. While the relay information storage unit 630 preserves an assignment date and time for managing assignment when a validity of assignment is set, it needs not to hold an assignment date and time if unnecessary.

The telephone relay device 600 internally connects to the telephone network 60 and has a communication termination unit 610 for terminating a call and a relay control unit 620 for controlling operation of the telephone relay device 600.

Figure 20:
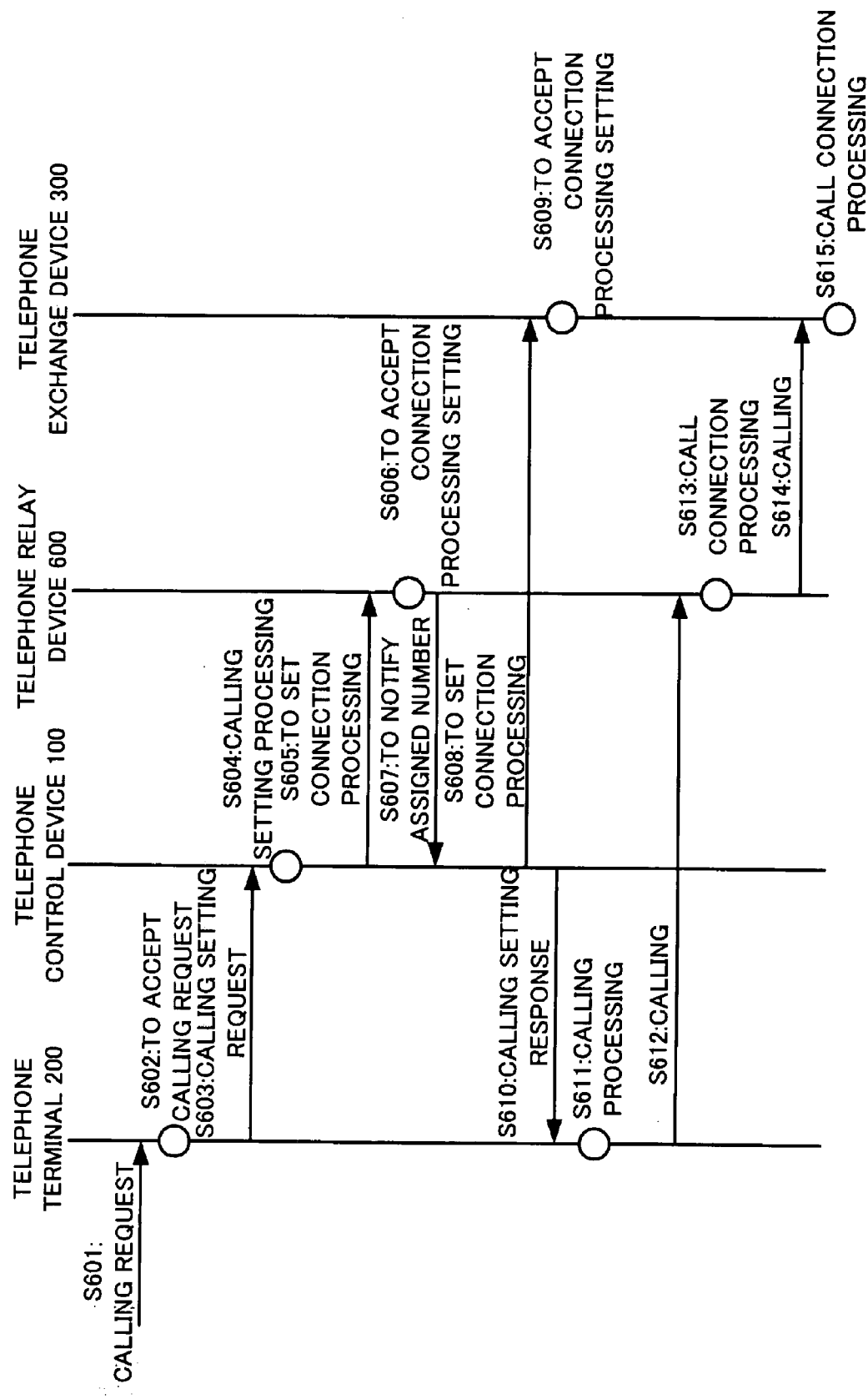
FIG. 20 is a flow chart showing calling processing executed in the telephone control system according to the fifth exemplary embodiment of the present invention.

Operation of the entire system according to the present exemplary embodiment will be described with reference to FIG. 20. FIG. 20 is a flow chart showing call control processing in the telephone control system according to the present exemplary embodiment.

First, a user of the telephone terminal 200 designates a telephone number (requested telephone number) to request calling through a user interface of the telephone terminal 200 (Step S601). The calling request from the user is accepted by the calling processing unit 210 of the telephone terminal 200 (Step S602). Upon receiving the calling request, the calling processing unit 210 connects to the telephone control device 100 through the network 50 to transmit a request for setting processing for calling (calling setting request) (Step S603).

In the calling setting request, the calling processing unit 210 transmits identification information of the telephone terminal 200 itself and information about the requested telephone number. The calling setting request is received by the calling control unit 130 through the data communication unit 110 of the telephone control device 100 (Step S604). The calling processing unit 210 of the telephone terminal 200 may be connected to the telephone control device 100 through the network 50 via a packet network in the telephone network 60. In this case, a gateway is disposed between the telephone network 60 and the network 50.

Figure 21:
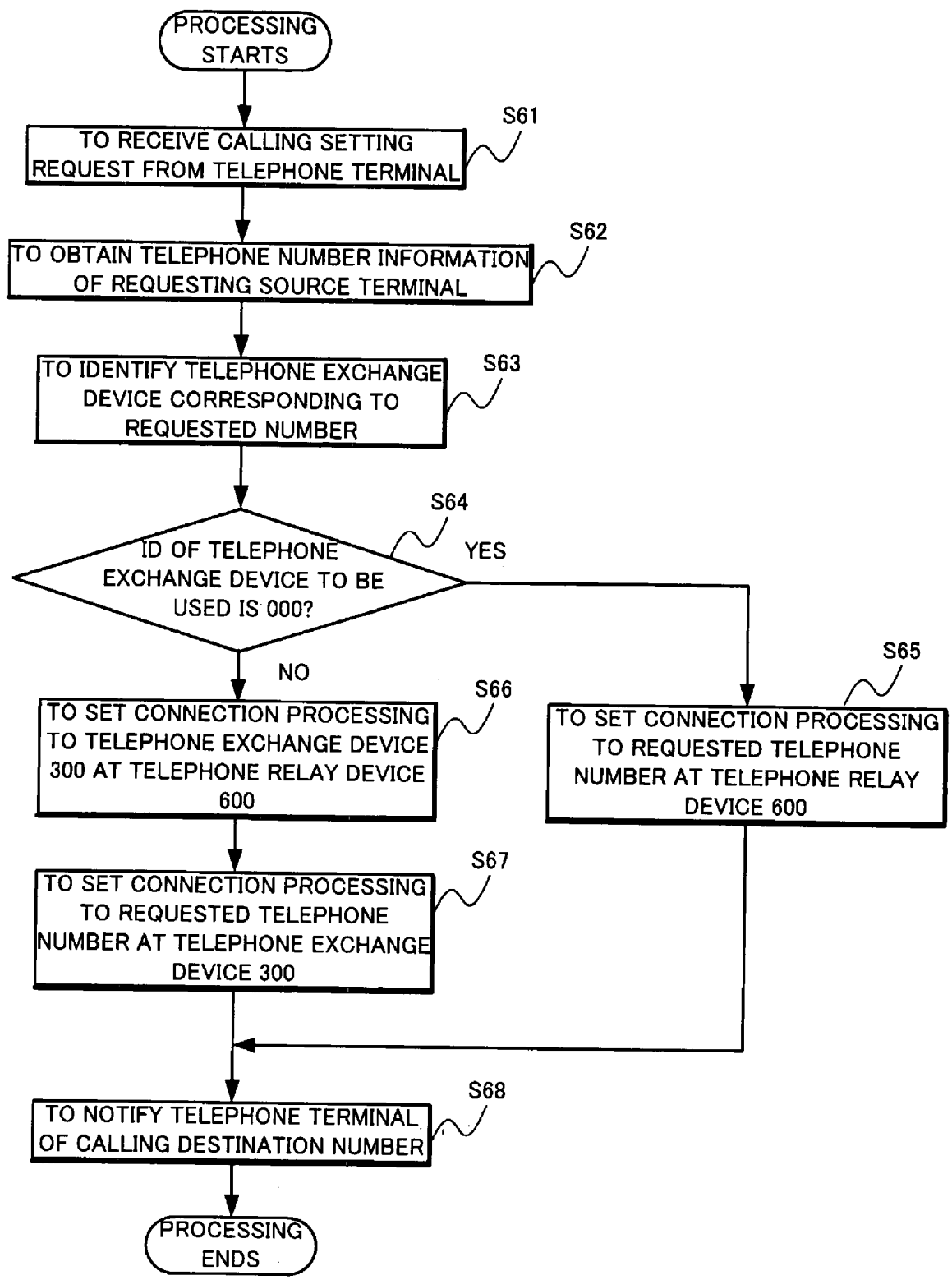
FIG. 21 is a flow chart showing call control processing executed by a calling control unit of the telephone control system according to the fifth exemplary embodiment of the present invention.

In the following, processing executed by the calling control unit 130 at Step S604 through Step S610 will be described in the following with reference to the flow chart of FIG. 21.

The calling control unit 130 receives a calling setting request from the calling processing unit 210 of the telephone terminal 200 (Step S61). As described above, the calling setting request includes identification information of the telephone terminal 200 as a requesting source and information about the requested telephone number. The calling control unit 130 obtains telephone number information of the telephone terminal 200 as a requesting source by using the identification information and telephone terminal information stored in the call control information storage unit 140 (Step S62). The calling control unit 130 may obtain telephone number information by using not the telephone terminal information stored in the call control information storage unit 140 but such information as a data base existing outside the telephone control device 100.

Next, the calling control unit 130 identifies the telephone exchange device 300 corresponding to the requested telephone number based on the information stored in the call control information storage unit 140 (Step S63). In a case, for example, where the contents of the telephone exchange device information stored in the call control information storage unit 140 are as those of the example shown in FIG. 15 and the requested telephone number is "82272764", the telephone exchange device corresponding to the requested telephone number will be the telephone exchange device whose telephone exchange device ID is 002. On the other hand, when the requested telephone number is "0441112222", the telephone exchange device ID corresponding to the requested telephone number will be 000. As described above, the telephone exchange device ID being 000 represents that there exists no corresponding telephone exchange device 300.

The calling control unit 130 may identify the telephone exchange device 300 by using not the telephone exchange device information stored in the call control information storage unit 140 but such information as a data base existing outside the telephone control device 100. Among examples of a data base existing outside the telephone control device 100 are a data base for managing a location and a connection state of the telephone terminal 200 and a data base for managing a function of a user of the telephone terminal 200 in an organization.

Next, while the calling control unit 130 sets call relay processing at the telephone relay device 600 (Step S605~Step S607 in FIG. 20), at the setting, the unit branches the processing by the value of the telephone exchange device ID specified at Step S63. Information to be transferred to the telephone relay device 600 by the calling control unit 130 at the setting of the call connection processing has two kinds. One is a telephone number of the telephone terminal 200 as a requesting source and the other is a transfer destination telephone number. Used as the transfer destination telephone number is subsequent information by the telephone exchange device ID specified at Step S63.

Condition for determining whether processing is to be branched or not is whether the telephone exchange device ID specified at Step S63 is 000 or not (Step S64). When the telephone exchange device ID specified at Step S63 is 000, the calling control unit 130 sets call connection processing at the telephone relay device 600 by using the requested telephone number as a transfer destination telephone number (Step S65). When the requested telephone number is "0441112222", for example, since the telephone exchange device ID corresponding to the requested telephone number is 000, the requested telephone number "0441112222" is as it is transmitted as a transfer destination telephone number to the telephone relay device 600.

When the ID of the telephone exchange device corresponding to the requested telephone number at Step S63 is other than 000, the calling control unit 130 sets call connection processing at the telephone relay device 600 with a representative telephone number corresponding to the telephone exchange device 300 as a transfer destination telephone number according to the telephone exchange device information preserved in the call control information storage unit 140 (Step S66). In a case, for example, where the example of FIG. 15 is used as telephone exchange device information, if the requested telephone number is "82272764", the telephone exchange device 300 corresponding to the requested telephone number will be the telephone exchange device whose ID is 002, so that the representative telephone number "04411111111" is transmitted to the telephone relay device 600 as a transfer destination telephone number.

Setting of the call connection processing is received by the relay control unit 620 of the telephone relay device 600. While the relay control unit 620 holds setting information given when receiving the request in the relay information storage unit 630, it also assigns a deputy telephone number at the same time. Assignment of a deputy telephone number is made to the given telephone number of the telephone terminal 200. Although possible assignment methods of a deputy telephone number are random selection from among prepared numbers and selection based on history of the past, since number selection algorithms have no effect on the nature of the present invention, its description will be omitted. When a deputy telephone number is assigned, the number and the telephone number of the telephone terminal 200 are preserved as such telephone number management information as shown in FIG. 19 in the relay information storage unit 630. The user terminal telephone number in FIG. 19 corresponds to the telephone number of the telephone terminal 200. Then, as a response to the connection processing setting, the assigned deputy telephone number is notified from the relay control unit 620 to the calling control unit 130 (Step S607).

After the execution of the processing at Step S66, the calling processing unit 130 sets call connection processing at the telephone exchange device 300 (Step S67, and Steps 608 and S609 in FIG. 20). In the processing at the present step, upon receiving an incoming call at the telephone exchange device 300 from the telephone terminal 200 as a requesting source, the calling processing unit 130 executes setting such that the call is connected to the requested telephone number. At this time, the telephone number notified to the telephone exchange device 300 by the calling number notification is not that of the telephone terminal 200 but a deputy telephone number assigned to the telephone number of the telephone terminal 200 by the telephone relay device 600. Since the deputy telephone number is that received as a response at Step S607, the deputy telephone number received as a response at Step S607 is used as a telephone number of the telephone terminal 200.

After the processing at Step S65 or S67, the calling processing unit 130 notifies the telephone terminal 200 as a requesting source of the telephone number of the telephone relay device 600 as a calling setting response through the data communication unit 110 and the network 50 (Step S68, Step S610 in FIG. 16).

Upon receiving the calling setting response from the calling control unit 130, the calling processing unit 210 of the telephone terminal 200 cuts off a connection through the network 50 if necessary to automatically make a call to the telephone number of the telephone relay device 600 indicated in the calling setting response (Steps S611 and S612). At this time, a calling confirmation screen might be displayed for the user by the function that the telephone terminal 200 has.

The telephone relay device 600 having received the call from the telephone terminal 200 receives the call from the telephone terminal 200 at the communication termination unit 610 and once terminates the same based on the connection processing setting executed at Steps S605 through S607, and then specifies a deputy telephone number assigned to the telephone terminal 200 with reference to the relay information storage unit 630 to connect the call to the telephone exchange device 300 through the communication termination unit 610 or directly to the requested telephone number by using the deputy telephone number (Steps S613 and 614). Among those described above, FIG. 20 shows an example where a call is connected via the telephone exchange device 300, which is a case where determination is made to use the telephone exchange device 300 by the determination processing at Step S65.

In this case, the telephone relay device 600 connects to the telephone exchange device 300, and the telephone exchange device 300 further connects the call from the deputy telephone number of the telephone terminal 200 via the telephone relay device 600 to the requested telephone number based on the connection processing setting executed at Steps S608 and S609 (Step S615).

The foregoing series of processing at Steps S601 through S615 realizes connection of a call from the telephone terminal 200 to the requested telephone number based on the designation by the user of the telephone terminal 200.

The above-described execution of the processing enables the user of the telephone terminal 200 to make a call by simple processing of designating only a telephone number to be called (requested telephone number) even when a plurality of representative numbers are used in the system. In addition, in a case, for example, where the telephone exchange device 300 is owned by a corporation and the telephone relay device 600 is owned by a telephone service provider, since to the telephone exchange device owned by the corporation, only a call to the corporation is connected to the telephone exchange device 300 owned by the corporation, loads on the telephone exchange device 300 owned by the corporation can be mitigated. Furthermore, in the example of the present exemplary embodiment, the telephone number of the telephone terminal 200 is hidden from a communication partner to protect privacy of the user of the telephone terminal 200.

In the above-described exemplary embodiment, the processing at Steps S605 through S607 or at Steps S608 and S609 is executed only by the telephone control device 100. Similarly to the example of FIG. 8 according to the first exemplary embodiment, however, adoptable is a structure in which the exchange control device 360 is incident to each telephone exchange device 300 shown in FIG. 8 or a structure in which the same is contained. In a case of such a structure, the calling control unit 130 transmits information about a calling source number and a requested telephone number or information about a representative telephone number of the telephone exchange device 300 to the telephone exchange device 300 as a setting target or to the exchange control device 360 corresponding to the telephone relay device 600, and the exchange control device 360 executes the processing of Steps S21 through S23 in FIG. 7. In this case, processing loads on the telephone control device 100 can be distributed to reduce control processing executed through the network 50.

While at Step S606 in the example of the present exemplary embodiment, a deputy telephone number is dynamically set based on connection processing setting, it can be statically determined in advance for the telephone number of the telephone terminal 200. In this case, the telephone number management information shown in FIG. 19 will be quasi-static information, which will be referred to at Step S606 without being rewritten. In addition, holding the same information in the call control information storage unit 140 of the telephone control device 100 enables a notification of a deputy telephone number to be omitted at a response at Step S607.

As a modification example of the present exemplary embodiment, the setting processing of connection to the telephone relay device 600 at Step S605 can be executed simultaneously with the processing of calling from the telephone terminal 200 at Step S612. Similarly to the modification example of the fourth exemplary embodiment, this case can be realized by generating a requested telephone number through the telephone relay device 600 or a telephone number for requesting a call to the telephone exchange device 300 and notifying the telephone terminal 200 of the generated telephone number at the stage of Step S68 in place of setting, at the telephone relay device 600, processing of connection to a requested telephone number or the telephone exchange device 300 at Step S65 or S66 in FIG. 21.

Sixth Exemplary Embodiment

Next, a sixth exemplary embodiment of the present invention will be described.

The present exemplary embodiment has the same structure as that of the fifth exemplary embodiment. Difference in operation resides in that a call is sent not from the telephone terminal 200 to the telephone relay device 600 but from the telephone relay device 600 to the telephone terminal 200.

Figure 22:
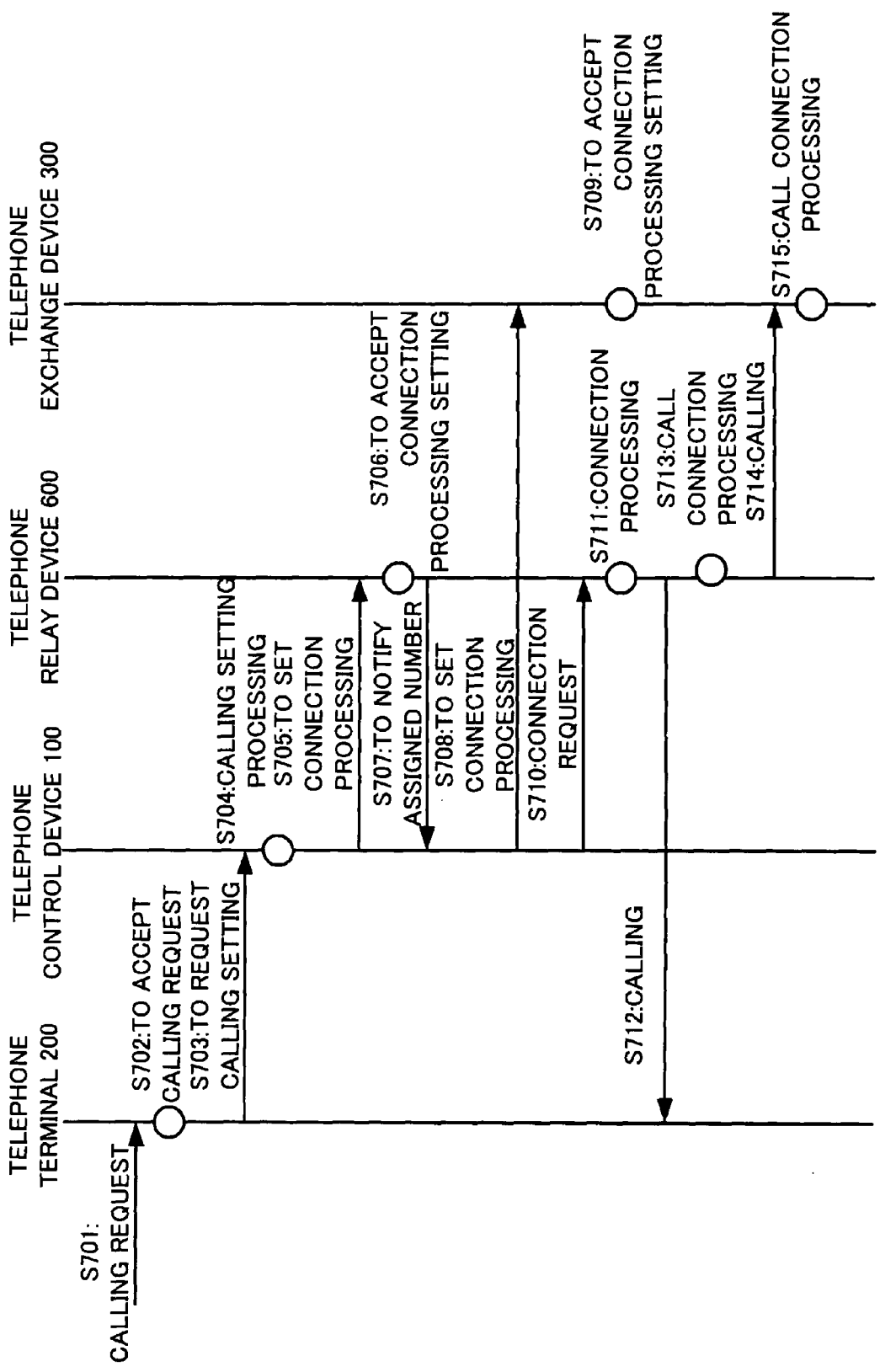
FIG. 22 is a flow chart showing calling processing executed in a telephone control system according to a sixth exemplary embodiment of the present invention.
Figure 23:
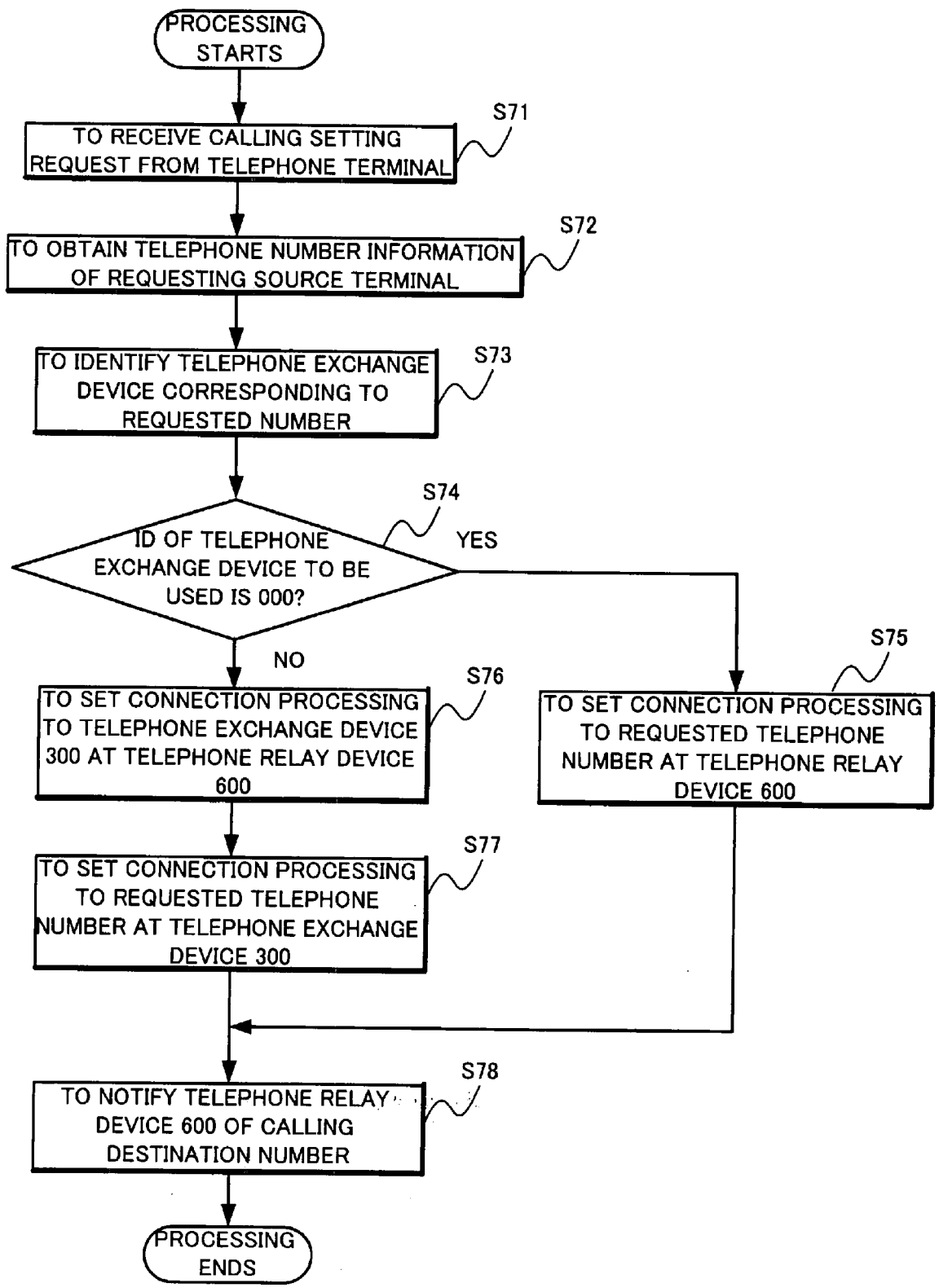
FIG. 23 is a flow chart showing call control processing executed by a calling control unit of the telephone control system according to the sixth exemplary embodiment of the present invention.

Example of an entire operation sequence is shown in FIG. 22, of which the description will be made of an example of a processing flow of the calling control unit 130 in the telephone control device 100 shown in FIG. 23 mainly with respect to a difference from FIG. 21 and FIG. 22 because the example is substantially the same as that of the fifth exemplary embodiment.

A user requests calling, and the calling processing unit 130 of the telephone control device 100 specifies a telephone exchange device ID of the telephone exchange device 300 corresponding to the requested number, sets the call connection processing at the telephone relay device 600 and receives a deputy telephone number to execute processing of call connection to the telephone exchange device 300 as required (Steps S701~S709, Steps S71~S77), which procedure is the same as that of the fifth exemplary embodiment (Steps S601~S609, Steps S61~S67).

While in the fifth exemplary embodiment, the calling control unit 130 thereafter notifies the telephone number of the telephone relay device 600 to the telephone terminal 200 (Step S610, Step S68) and the telephone terminal 200 makes a call to the telephone relay device 600 (Steps S611 and S612), in the present exemplary embodiment, without notifying the telephone number of the telephone relay device 600 to the telephone terminal 200, the calling control unit 130 instructs the telephone relay device 600 to make a call to the telephone terminal 200, as well as to make a call to the telephone number specified at Step S73 to relay voice of two calls (Step S78, Steps S710 and S711). The telephone relay device 600 having received the instruction first makes a call to the telephone terminal 200 (Step S712) and when the call is established, makes a call to the telephone exchange device 300 or directly to the requested telephone number (Steps S713 and S714). When making a call to the telephone exchange device 300 or directly to the requested telephone number, the telephone relay device 600 notifies the deputy telephone number assigned at the setting processing at Step S75 or S76 as a caller number. Then, when a call is made to the telephone exchange device 300, the telephone exchange device 300 makes a call to the requested telephone number according to the setting of Step S708 (Step S715).

Also in the example of the present exemplary embodiment, similarly to the fifth exemplary embodiment, a deputy telephone number can be statically determined in advance for the telephone number of the telephone terminal 200. In this case, the telephone number management information shown in FIG. 19 will be quasi-static information, which will be referred to at Step S706 without being rewritten. In addition, holding the same information in the call control information storage unit 140 of the telephone control device 100 enables a notification of a deputy telephone number to be omitted at Step S707.

Seventh Exemplary Embodiment

Next, a seventh exemplary embodiment of the present invention will be described.

The present exemplary embodiment has the same structure as that of the fifth exemplary embodiment. Difference in operation resides in that the telephone relay device 600 determines a deputy telephone number of the telephone terminal 200 not upon reception of a request for setting connection processing from the calling processing unit 130 of the telephone control device 100 but upon reception of a call from the telephone terminal 200. This solves a problem that when although a deputy number is issued, the processing sequence is stopped for one reason or another, the deputy number remains unused.

Figure 24:
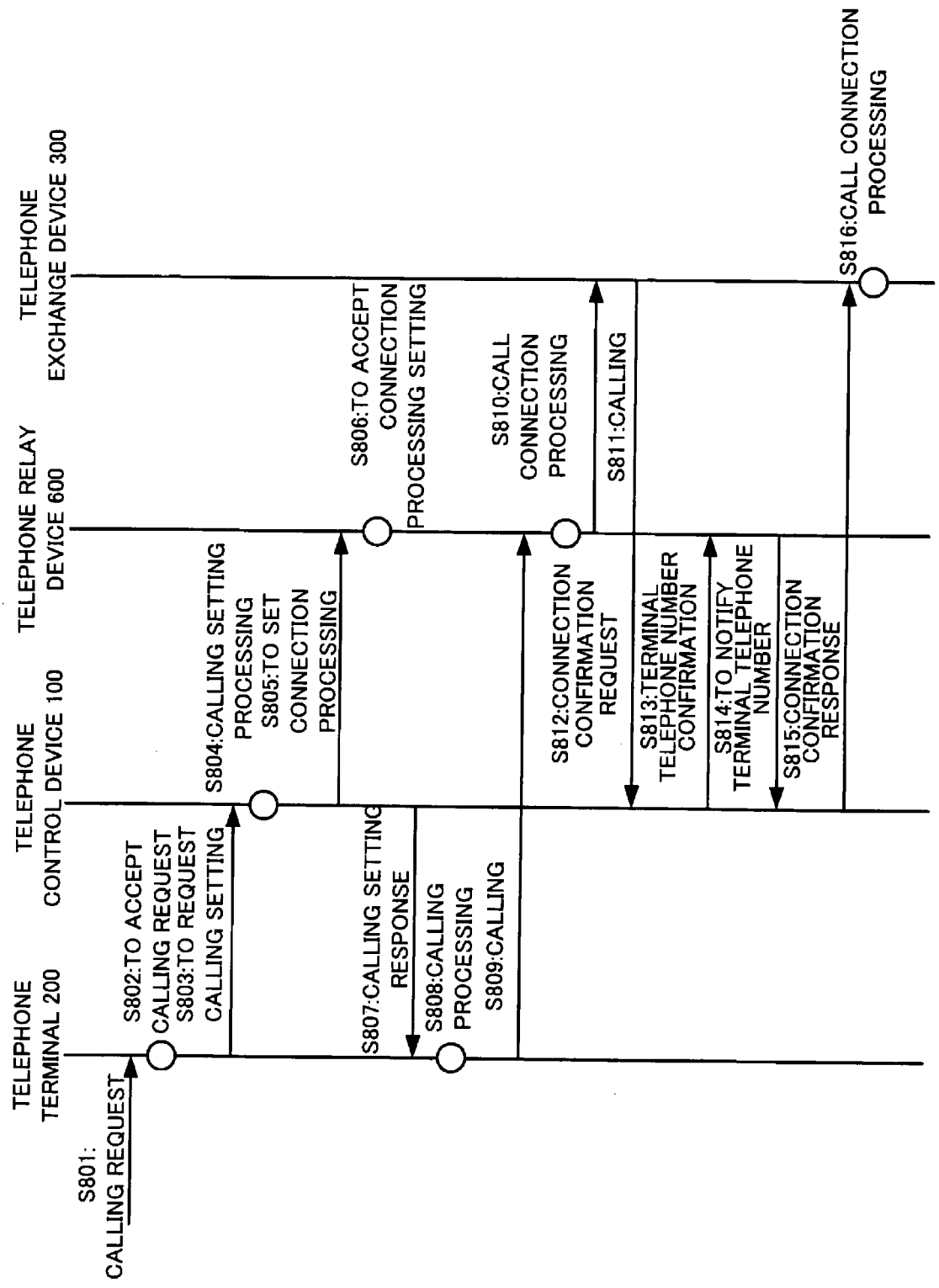
FIG. 24 is a flow chart showing calling processing executed in a telephone control system according to a seventh exemplary embodiment of the present invention.
Figure 25:
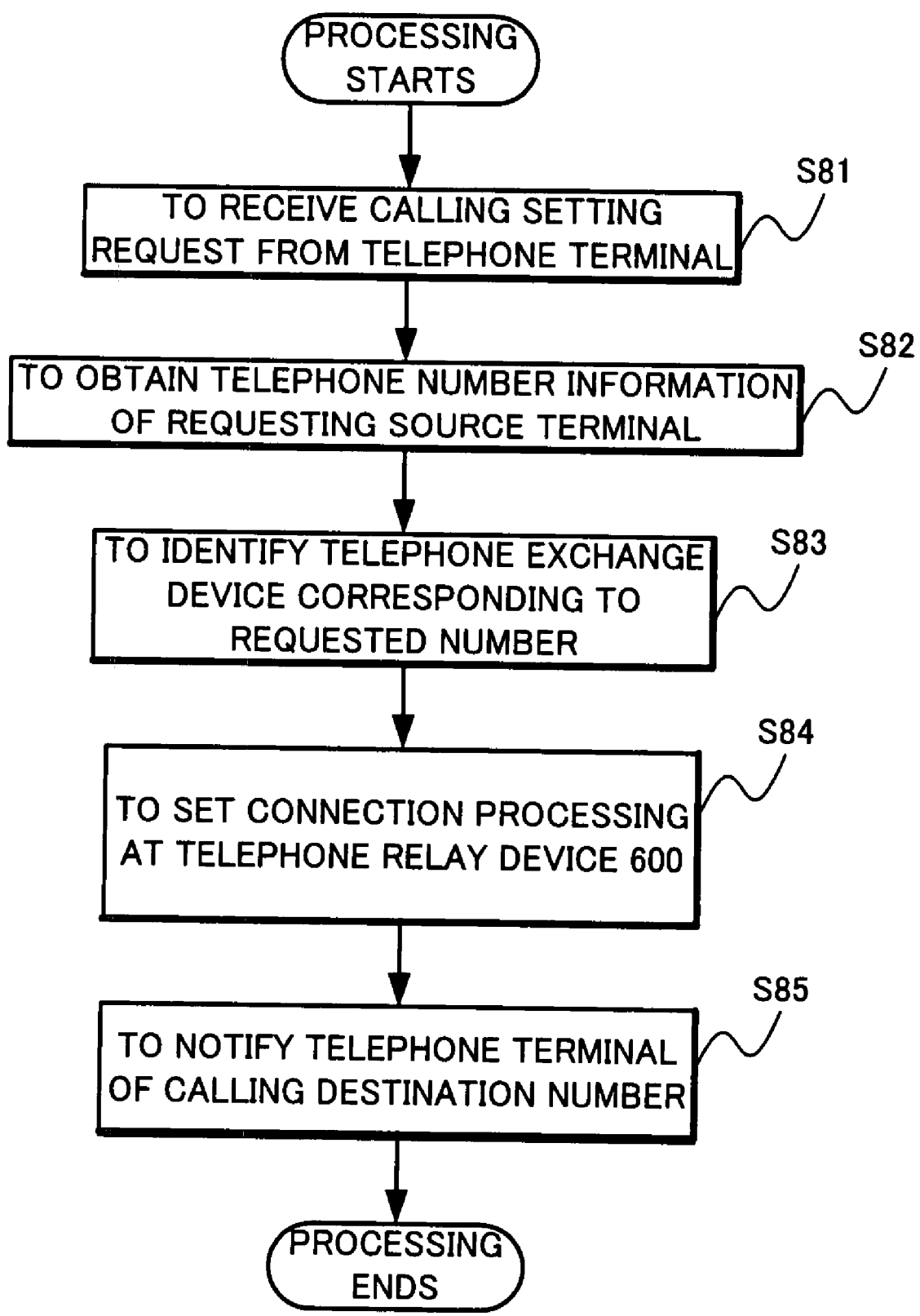
FIG. 25 is a flow chart showing call control processing executed by a calling control unit of the telephone control system according to the seventh exemplary embodiment of the present invention.

Example of an entire operation sequence according to the present exemplary embodiment is shown in FIG. 24, of which the description will be made of an example of a processing flow of the calling control unit 130 of the telephone control device 100 shown in FIG. 25 mainly with respect to a difference from FIG. 20 and FIG. 21 because the example is substantially the same as that of the fifth exemplary embodiment.

A user requests calling, and the calling processing unit 130 of the telephone control device 100 specifies a telephone exchange device ID of the telephone exchange device corresponding to the requested number and sets the call connection processing at the telephone relay device 600 (Steps S801~S805, Steps S81~S84), which procedure is the same as that of the fifth exemplary embodiment (Steps S601~S605, Steps S61~S65 or S66).

At the time of setting call connection processing at Step S806, the telephone relay device 600 ends the setting processing without assigning a deputy telephone number of the telephone terminal 200. The calling control unit 130 responsively notifies the number of the telephone relay device 600 to the telephone terminal 200 (Step S85, Step S807). The telephone terminal 200 responsively makes a call to the telephone relay device 600 (Steps S808 and S809). Upon receiving the calling request, the telephone relay device 600 specifies the telephone terminal 200 by the notification of the caller's number to assign the deputy telephone number (Step S810). Information of the assigned deputy telephone number is stored in the relay information storage unit 630 in pair with the telephone number of the telephone terminal 200.

Furthermore, the telephone relay device 600 transmits a call to the telephone exchange device 300 or the requested telephone number according to the setting of the call connection processing. At this time, notify the deputy telephone number assigned to the telephone terminal 200 as a caller's number (Step S811). When receiving the call, the telephone exchange device 300 specifies a deputy telephone number by the notification of the caller's number to request that the calling processing unit 130 of the telephone control device 100 should confirm the telephone number of the telephone terminal 200 (Step S812).

The request is transferred from the calling processing unit 130 further to the telephone relay device 600 (Step S813) and collated with the information of the relay information storage unit 630 in the telephone relay device 600, so that the telephone number of the telephone terminal 200 is returned to the calling processing unit 130 as a response (Step S814). The calling processing unit 130 specifies a requested telephone number based on thus obtained telephone number information of the telephone terminal 200 to send the information of the requested telephone number to the telephone exchange device 300 as a response (Step S815). The telephone exchange device 300 having received the response transmits the accepted call to the requested telephone number (Step S816).

In this case, because the state of the telephone exchange device 300 is yet to be known until Step S811 at which the call is actually connected, it is possible to confirm activeness/inactiveness of the telephone exchange device 300 at the calling setting processing (Step S804). In this case, if the telephone exchange device 300 is not in operation, possible is to distribute the call to other telephone exchange device 300 or to send an error response.

It is also possible to statically set a deputy telephone number for the telephone terminal 200. In this case, the telephone number management information shown in FIG. 19 will be quasi-static information, which will be referred to at Step S810 without being rewritten. Holing the same information in the call control information storage unit 140 of the telephone control device 100 enables omission of Steps S813 and S814 at which the calling processing unit 130 confirms the telephone relay device 600 about the deputy telephone number in response to the connection confirmation request at Step S812.

As another modification example, possible is to execute the setting of the processing of connection to the telephone relay device 600 at Step S805 simultaneously with the processing of calling from the telephone terminal 200 at Step S809. Similarly to the modification example of the fourth exemplary embodiment, this case can be realized by generating a requested telephone number through the telephone relay device 600 or a telephone number for making a request for a call to the telephone exchange device 300 and notifying the telephone terminal of the generated telephone number at the stage of Step S85 in place of setting, at the telephone relay device 600, processing of connection to the requested telephone number or the telephone exchange device 300 at Step S84 in FIG. 25.

Eighth Exemplary Embodiment

Next, an eighth exemplary embodiment of the present invention will be described.

The present exemplary embodiment has the same structure as that of the seventh exemplary embodiment. Difference in operation resides in that a call is sent not from the telephone terminal 200 to the telephone relay device 600 but from the telephone relay device 600 to the telephone terminal 200. This difference is the same as that of the sixth exemplary embodiment from the fifth exemplary embodiment.

Figure 26:
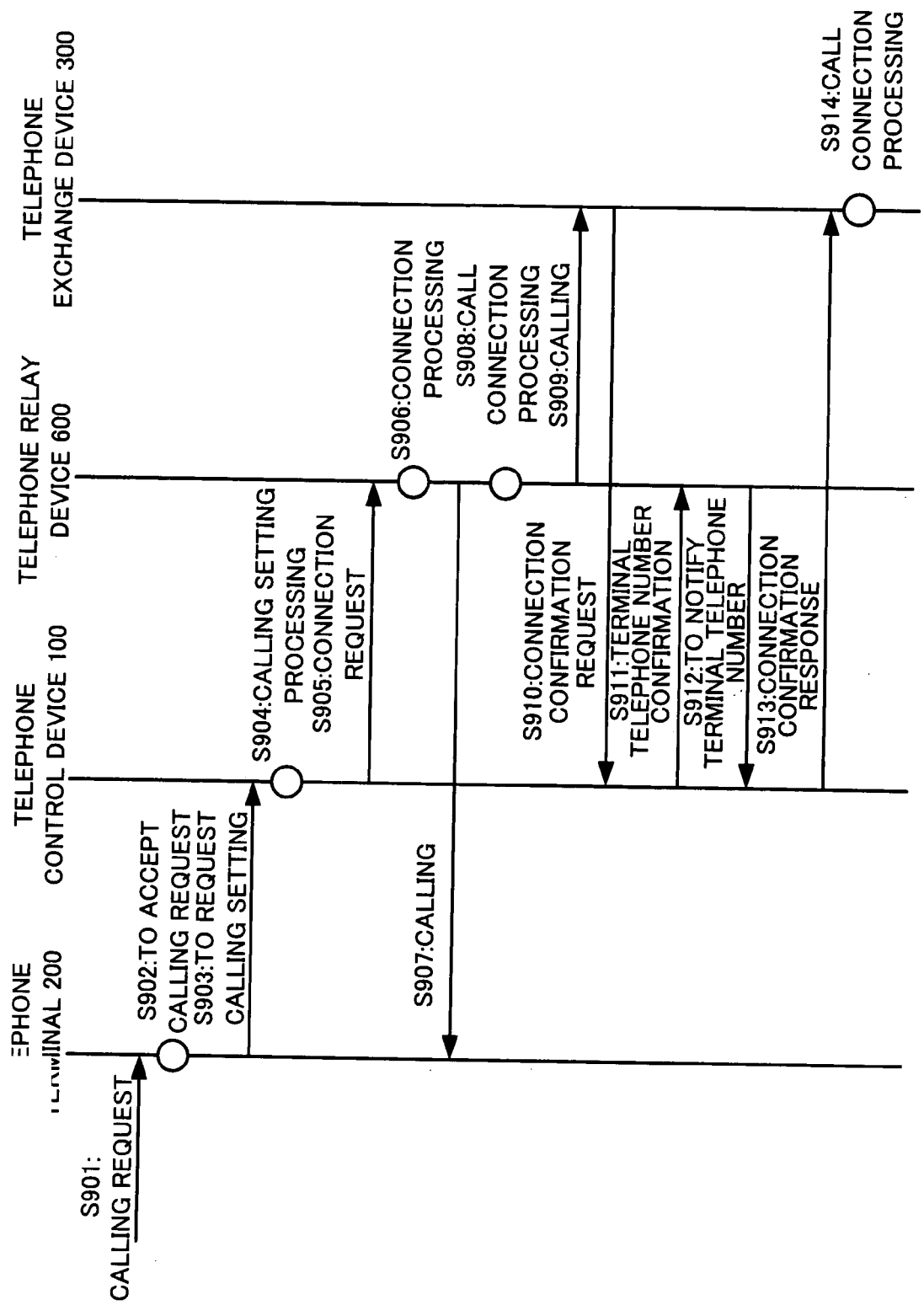
FIG. 26 is a flow chart showing calling processing executed in a telephone control system according to an eighth exemplary embodiment of the present invention.
Figure 27:
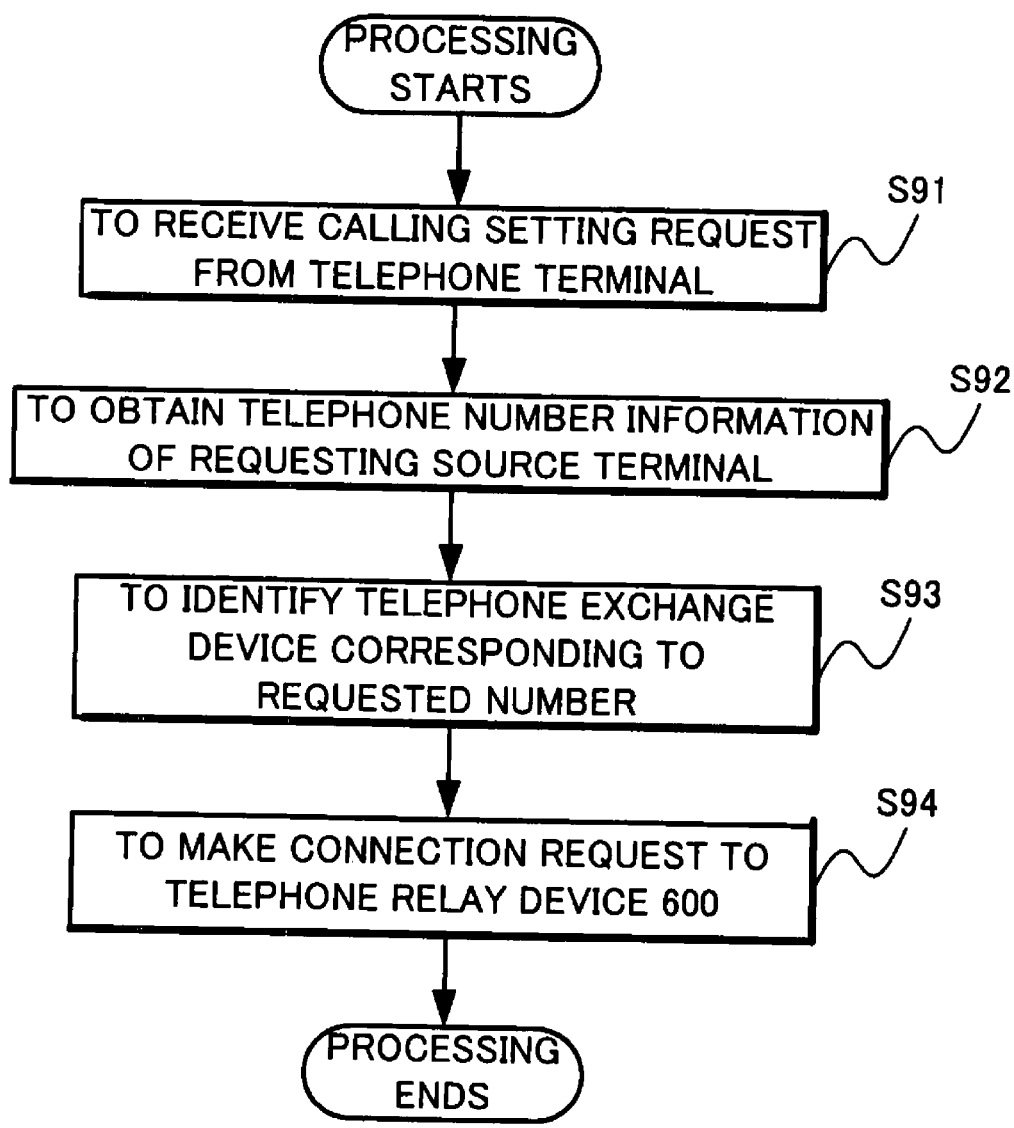
FIG. 27 is a flow chart showing call control processing executed by a calling control unit of the telephone control system according to the eighth exemplary embodiment of the present invention.

Example of an entire operation sequence according to the present exemplary embodiment is shown in FIG. 26, of which the description will be made of an example of a processing flow of the calling control unit 130 in the telephone control device 100 shown in FIG. 27 mainly with respect to a difference from FIG. 24 and FIG. 25 because the example is substantially the same as that of the sixth exemplary embodiment.

A user requests calling and the calling processing unit 130 of the telephone control device 100 specifies a telephone exchange device ID of the telephone exchange device corresponding to the requested number (Steps S901~S904, Steps S91~S93), which procedure is the same as that of the seventh exemplary embodiment (Steps S801~S804, Steps S81~S83).

Thereafter, while in the seventh exemplary embodiment, after setting connection processing at the telephone relay device 600 (Steps S805 and S806), the calling control unit 130 notifies the telephone number of the telephone relay device 600 to the telephone terminal 200 (Step S807 and Step S85), so that the telephone terminal 200 makes a call to the telephone relay device 600 (step S809), in the present exemplary embodiment, without executing connection processing to the telephone relay device 600 and notifying the telephone number of the telephone relay device 600 to the telephone terminal 200, the calling control unit 130 instructs the telephone relay device 600 to make a call to the telephone terminal 200, as well as to make a call to the telephone number specified at Step S93 to relay voice of two calls (Steps S94, Steps S905 and S906).

The telephone relay device 600 having received the instruction first makes a call to the telephone terminal 200 (Step S907) and when the call is established, then makes a call to the telephone exchange device 300 or directly to the requested telephone number (Steps S908 and S909). At this time, the telephone relay device 600 assigns a deputy telephone number to the telephone terminal 200 and when making a call to the telephone exchange device 300 or directly to the requested telephone number, notifies the assigned telephone number as a caller's number.

Then, when the telephone relay device 600 makes a call to the telephone exchange device 300, the telephone exchange device 300 specifies a deputy telephone number by the caller's number notification and requests that the calling processing unit 130 of the telephone control device 100 should confirm the telephone number of the telephone terminal 200 (Step S910) similarly to Steps S812~S816 of the seventh exemplary embodiment.

The request is transferred from the calling processing unit 130 further to the telephone relay device 600 (Step S911) and collated with the information of the relay information storage unit 630 in the telephone relay device 600 by the telephone relay device 600, so that the telephone number of the telephone terminal 200 is returned to the calling processing unit 130 as a response (Step S912). The calling processing unit 130 specifies a requested telephone number based on thus obtained telephone number information of the telephone terminal 200 to send the information of the requested telephone number to the telephone exchange device 300 as a response (Step S913). The telephone exchange device 300 having received the response transmits the accepted call to the requested telephone number (Step S914).

It is also possible to statically set a deputy telephone number for the telephone number of the telephone terminal 200 similarly to the seventh exemplary embodiment. In this case, the telephone number management information shown in FIG. 19 will be quasi-static information, which will be referred to at Steps S908 and S909 without being rewritten.

Holing the same information in the call control information storage unit 140 of the telephone control device 100 enables omission of Steps S911 and S912 at which the calling processing unit 130 confirms the telephone relay device 600 about the deputy telephone number in response to the connection confirmation request at Step S910.

Use of the telephone exchange device according to each of the above-described exemplary embodiments enables a service provider organization such as a corporation to run business using the telephone control device of the present invention. For example, for a service provider organization holding the telephone control device 100 and a service user organization having a telephone exchange device, business can be realized which provides services by using the telephone control device 100. More specifically, the service provider organization executes control processing of the telephone exchange device that the service user organization has for the user organization by using the telephone control function of the telephone control device 100 as service to be provided to the service user organization. The service user organization pays money to the service provider organization in exchange for the execution of the control processing. The service user organization enjoys a merit of the control processing executed by the telephone control device according to the present invention without purchasing and operating the telephone control device 100 by itself.

In addition, the service provider organization is allowed to run business of providing service to a plurality of service user organizations by using one telephone control device 100 and obtaining an equivalent value therefor.

The telephone terminal is preferably structured to, upon receiving telephone number information from a telephone exchange device, automatically call to a telephone number indicated by the telephone number information.

The exchange control device has a function of controlling, for example, a telephone exchange device to connect an incoming call to a calling destination telephone number.

Calling can be properly connected even when a telephone number system for identifying an extension telephone terminal accommodated in the telephone exchange device and a telephone number system of the entire system differ from each other.

Calling to a desired extension telephone terminal can be made based on information easy to memorize for a user of a telephone terminal.

An exemplary advantage according to the present invention enables a telephone system to be realized which allows calling to be made with ease from an outside line to a desired extension telephone terminal in an extension telephone network having a plurality of representative numbers.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INCORPORATION BY REFERENCE

This application is based upon and claims the benefit of priority from Japanese patent application No. 2005-113376, filed on Apr. 11, 2005, the disclosure of which is incorporated herein in its entirety by reference.

The invention claimed is:

1. A telephone control device connected to a plurality of telephone terminals and a plurality of telephone exchange devices connected to a plurality of stages of layered structure, said telephone control device comprising:

a designation accepting unit which accepts designation of a calling destination telephone number from a telephone terminal;

a connection setting unit which selects a telephone exchange device from telephone exchange devices connected to a second stage among said plurality of telephone exchange devices based on a calling destination telephone number accepted by said designation accepting unit or selects not to use a telephone exchange device connected to the second stage, and when selecting not to use a telephone exchange device connected to the second stage, executes connection setting at a first-stage telephone exchange device so as to connect a call from a telephone terminal which designates the calling destination telephone number to the calling destination telephone number and when selecting to use a telephone exchange device connected to the second stage, executes connection setting at a first-stage telephone exchange device so as to connect a call from said telephone terminal which designates the calling destination telephone number to said selected second-stage telephone exchange device, as well as executes connection setting at said selected second-stage telephone exchange device so as to connect a call from the telephone terminal which designates the calling destination telephone number to the calling destination telephone number; and a telephone number information transmission unit which transmits telephone number information of said first-stage telephone exchange device to a telephone terminal which designates a calling destination telephone number.

2. A telephone control device connected to a plurality of telephone terminals, a plurality of telephone exchange devices and a telephone relay device, said telephone control device comprising:

a designation accepting unit which accepts designation of a calling destination telephone number from a telephone terminal;

a connection setting unit which selects a telephone exchange device from among said plurality of telephone exchange devices based on a calling destination telephone number accepted by said designation accepting unit or selects not to use a telephone exchange device, and when selecting not to use a telephone exchange device, executes connection setting at said telephone relay device so as to connect a call from a telephone terminal which designates the calling destination telephone number to the calling destination telephone number and when selecting to use a telephone exchange device, executes connection setting at said telephone relay device so as to connect a call from said telephone terminal which designates the calling destination telephone number to said selected telephone exchange device, as well as executes connection setting at said selected telephone exchange device to, after obtaining a deputy telephone number for said telephone terminal, connect a call from said deputy telephone number to the calling destination telephone number; and a telephone number information transmission unit which transmits telephone number information of said telephone relay device to a telephone terminal which designates a calling destination telephone number.

3. A telephone control device connected to a plurality of telephone terminals, a plurality of telephone exchange devices and a telephone relay device, said telephone control device comprising:

a designation accepting unit which accepts designation of a calling destination telephone number from a telephone terminal; and a connection setting unit which selects a telephone exchange device from among said plurality of telephone exchange devices based on a calling destination telephone number accepted by said designation accepting unit or selects not to use a telephone exchange device, and when selecting not to use a telephone exchange device, gives a connection instruction to said telephone relay device to enable, after connecting both a telephone terminal which designates a calling destination telephone number and the calling destination telephone number to the call, communication between both of said telephone terminals and when selecting to use a telephone exchange device, with a deputy telephone number to said telephone terminal which designates the calling destination telephone number assigned to said telephone relay device, executes connection setting at said selected telephone exchange device so as to connect a call from the deputy telephone number to the calling destination telephone number, as well as gives a connection instruction to said telephone relay device to enable, after connecting both said telephone terminal which designates the calling destination telephone number and said selected telephone exchange device to the call, communication between both of said telephone terminals.

4. A telephone control device connected to a plurality of telephone terminals, a plurality of telephone exchange devices and a telephone relay device, said telephone control device comprising:

a designation accepting unit which accepts designation of a calling destination telephone number from a telephone terminal;

a connection setting unit which selects a telephone exchange device from among said plurality of telephone exchange devices based on a calling destination telephone number accepted by said designation accepting unit or selecting not to use a telephone exchange device, and when selecting not to use a telephone exchange device, executes connection setting at said telephone relay device so as to connect a call from a telephone terminal which designates a calling destination telephone number to the calling destination telephone number and when selecting to use a telephone exchange device, executes connection setting at said telephone relay device so as to connect a call from said telephone terminal which designates the calling destination telephone number to a selected telephone exchange device;

a telephone number information transmission unit which transmits telephone number information of said telephone relay device to a telephone terminal which designates a calling destination telephone number; and a connection destination confirmation unit which receives a calling source telephone number from a telephone exchange device and obtains a telephone number of a telephone terminal to which the calling source telephone number is assigned as a deputy telephone number from said telephone relay device and transmits a calling destination telephone number designated by said telephone terminal having the obtained telephone number as a response to said telephone exchange device.

5. A telephone control device connected to a plurality of telephone terminals, a plurality of telephone exchange devices and a telephone relay device, said telephone control device comprising:
- a designation accepting unit which accepts designation of a calling destination telephone number from a telephone terminal;
- a connection setting unit which selects a telephone exchange device from among said plurality of telephone exchange devices based on a calling destination telephone number accepted by said designation accepting unit or selects not to use a telephone exchange device, and when selecting not to use a telephone exchange device, gives a connection instruction to said telephone relay device to enable, alter connecting both a telephone terminal which designates a calling destination telephone number and the calling destination telephone number to the call, communication between both of said telephone terminals and when selecting to use a telephone exchange device, gives a connection instruction to said telephone relay device to enable, after connecting both said telephone terminal which designates the calling destination telephone number and said selected telephone exchange device to the call, communication between both of said telephone terminals; and
- a connection destination confirmation unit which receives a calling source telephone number from a telephone exchange device, obtains a telephone number of a telephone terminal to which the calling source telephone number is assigned as a deputy telephone number from said telephone relay device and transmits a calling destination telephone number designated by said telephone terminal having the obtained telephone number as a response to said telephone exchange device.

6. A telephone control method in a telephone control device connected to a plurality of telephone terminals and a plurality of telephone exchange devices connected to a plurality of stages of layered structure, said telephone control method comprising:
- accepting designation of a calling destination telephone number from a telephone terminal;
- selecting a telephone exchange device from telephone exchange devices connected to a second stage among said plurality of telephone exchange devices based on a calling destination telephone number accepted by said accepting designation or selecting not to use a telephone exchange device connected to the second stage, and when selecting not to use a telephone exchange device connected to the second stage, executing connection setting at a first-stage telephone exchange device so as to connect a call from a telephone terminal which designates the calling destination telephone number to the calling destination telephone number and when selecting to use a telephone exchange device connected to the second stage, executing connection setting at a first-stage telephone exchange device so as to connect a call from said telephone terminal which designates the calling destination telephone number to the selected second-stage telephone exchange device, as well as executing connection setting at said selected second-stage telephone exchange device so as to connect a call from said telephone terminal which designates the calling destination telephone number to the calling destination telephone number; and
- transmitting telephone number information of said first-stage telephone exchange device to said telephone terminal which designates the calling destination telephone number.

7. A telephone control method in a telephone control device connected to a plurality of telephone terminals, a plurality of telephone exchange devices and a telephone relay device, said telephone control method comprising:
- accepting designation of a calling destination telephone number from a telephone terminal;
- selecting a telephone exchange device from among said plurality of telephone exchange devices based on the calling destination telephone number accepted at said accepting designation or selecting not to use a telephone exchange device, and when selecting not to use a telephone exchange device, executing connection setting at said telephone relay device so as to connect a call from said telephone terminal which designates the calling destination telephone number to the calling destination telephone number and when selecting to use a telephone exchange device, executing connection setting at said telephone relay device so as to connect a call from said telephone terminal which designates the calling destination telephone number to said selected telephone exchange device, as well as executing connection setting at said selected telephone exchange device to, after obtaining a deputy telephone number for said telephone terminal, connect a call from said deputy telephone number to the calling destination telephone number; and
- transmitting telephone number information of said telephone relay device to said telephone terminal which designates the calling destination telephone number.

8. A telephone control method in a telephone control device connected to a plurality of telephone terminals, a plurality of telephone exchange devices and a telephone relay device, said telephone control method comprising:
- accepting designation of a calling destination telephone number from a telephone terminal; and
- selecting a telephone exchange device from among said plurality of telephone exchange devices based on a calling destination telephone number accepted at said accepting designation or selecting not to use a telephone exchange device, and when selecting not to use a telephone exchange device, giving a connection instruction to said telephone relay device to enable, after connecting both said telephone terminal which designates the calling destination telephone number and the calling destination telephone number to the call, communication between both of said telephone terminals and when selecting to use a telephone exchange device, with a deputy telephone number to said telephone terminal which designates the calling destination telephone number assigned to said telephone relay device, executing connection setting at said selected telephone exchange device so as to connect a call from the deputy telephone number to the calling destination telephone number, as well as giving a connection instruction to said telephone relay device to enable, after connecting both said telephone terminal which designates the calling destination telephone number and said selected telephone exchange device to the call, communication between both of said telephone terminals.

9. A telephone control method in a telephone control device connected to a plurality of telephone terminals, a plurality of telephone exchange devices and a telephone relay device, said telephone control method comprising:

accepting designation of a calling destination telephone number from a telephone terminal;

selecting a telephone exchange device from among said plurality of telephone exchange devices based on the calling destination telephone number accepted at said accepting designation or selecting not to use a telephone exchange device, and when selecting not to use a telephone exchange device, executing connection setting at said telephone relay device so as to connect a call from said telephone terminal which designates the calling destination telephone number to the calling destination telephone number and when selecting to use a telephone exchange device, executing connection setting at said telephone relay device so as to connect a call from said telephone terminal which designates the calling destination telephone number to said selected telephone exchange device;

transmitting telephone number information of said telephone relay device to said telephone terminal which, designates the calling destination telephone number; and receiving a calling source telephone number from a telephone exchange device, obtaining a telephone number of a telephone terminal to which the calling source telephone number is assigned as a deputy telephone number from said telephone relay device and transmitting a calling destination telephone number designated by said telephone terminal having the obtained telephone number as a response to said telephone exchange device.

10. A telephone control method in a telephone control device connected to a plurality of telephone terminals, a plurality of telephone exchange devices and a telephone relay device, said telephone control method comprising:

accepting designation of a calling destination telephone number from a telephone terminal;

selecting a telephone exchange device from among said plurality of telephone exchange devices based on the calling destination telephone number accepted at said accepting designation or selecting not to use a telephone exchange device, and when selecting not to use a telephone exchange device, giving a connection instruction to said telephone relay device to enable, after connecting both said telephone terminal which designates the calling destination telephone number and the calling destination telephone number to the call, communication between both of said telephone terminals and when selecting to use a telephone exchange device, giving a connection instruction to said telephone relay device to enable, after connecting both said telephone terminal which designates the calling destination telephone number and said selected telephone exchange device to the call, communication between both of said telephone terminals; and receiving a calling source telephone number from a telephone exchange device, obtaining a telephone number of a telephone terminal to which the calling source telephone number is assigned as a deputy telephone number from said telephone relay device and transmitting a calling destination telephone number designated by said telephone terminal having the obtained telephone number as a response to said telephone exchange device.

11. A telephone controlling program for causing a computer mounted on a telephone control device connected to a plurality of telephone terminals and a plurality of telephone exchange devices connected to a plurality of stages of layered structure, which program makes a computer execute:

a designation accepting processing of accepting designation of a calling destination telephone number from a telephone terminal;

a connection setting processing of selecting a telephone exchange device from telephone exchange devices connected to a second stage among said plurality of telephone exchange devices based on the calling destination telephone number accepted by said designation accepting processing or selecting not to use a telephone exchange device connected to the second stage, and when selecting not to use a telephone exchange device connected to the second stage, executing connection setting at a first-stage telephone exchange device so as to connect a call from a telephone terminal which designates the calling destination telephone number to the calling destination telephone number and when selecting to use a telephone exchange device connected to the second stage, executing connection setting at a first-stage telephone exchange device so as to connect a call from said telephone terminal which designates the calling destination telephone number to the selected second-stage telephone exchange device, as well as executing connection setting at said selected second-stage telephone exchange device so as to connect a call from said telephone terminal which designates the calling destination telephone number to the calling destination telephone number; and a telephone number information transmission processing of transmitting telephone number information of said first-stage telephone exchange device to said telephone terminal which designates the calling destination telephone number.

12. A telephone controlling program for causing a computer mounted on a telephone control device connected to a plurality of telephone terminals, a plurality of telephone exchange devices and a telephone relay device, which program makes a computer execute:

a designation accepting processing of accepting designation of a calling destination telephone number from a telephone terminal;

a connection setting processing of selecting a telephone exchange device from among said plurality of telephone exchange devices based on the calling destination telephone number accepted at said designation accepting processing or selecting not to use a telephone exchange device, and when selecting not to use a telephone exchange device, executing connection setting at a telephone relay device so as to connect a call from said telephone terminal which designates the calling destination telephone number to the calling destination telephone number and when selecting to use a telephone exchange device, executing connection setting at said telephone relay device so as to connect a call from said telephone terminal which designates the calling destination telephone number to said selected telephone exchange device, as well as executing connection setting at said selected telephone exchange device so as to, after obtaining a deputy telephone number for said telephone terminal, connect a call from said deputy telephone number to the calling destination telephone number, and a telephone number information transmission processing of transmitting telephone number information of said telephone relay device to said telephone terminal which designates the calling destination telephone number.

13. A telephone controlling program for causing a computer mounted on a telephone control device connected to a plurality of telephone terminals, a plurality of telephone exchange devices and a telephone relay device, which program makes a computer execute:

a designation accepting processing of accepting designation of a calling destination telephone number from a telephone terminal; and a connection setting processing of selecting a telephone exchange device from among said plurality of telephone exchange devices based on the calling destination telephone number accepted at said designation accepting processing or selecting not to use a telephone exchange device, and when, selecting not to use a telephone exchange device, giving a connection instruction to said telephone relay device so as to enable, after connecting both said telephone terminal which designates the calling destination telephone number and the calling destination telephone number to the call, communication between both of said telephone terminals and when selecting to use a telephone exchange device, with a deputy telephone number to said telephone terminal which designates the calling destination telephone number assigned to said telephone relay device, executing connection setting at said selected telephone exchange device so as to connect a call from the deputy telephone number to the calling destination telephone number, as well as giving a connection instruction to said telephone relay device to enable, after connecting both said telephone terminal which designates the calling destination telephone number and said selected telephone exchange device to the call, communication between both of said telephone terminals.

14. A telephone controlling program for causing a computer mounted on a telephone control device connected to a plurality of telephone terminals, a plurality of telephone exchange devices and a telephone relay device, which program makes a computer execute;

a designation accepting processing of accepting designation of a calling destination telephone number from a telephone terminal;

a connection setting processing of selecting a telephone exchange device from among said plurality of telephone exchange devices based on the calling destination telephone number accepted at said designation accepting processing or selecting not to use a telephone exchange device, and when selecting not to use a telephone exchange device, executing connection setting at said telephone relay device so as to connect a call from said telephone terminal which designates the calling destination telephone number to the calling destination telephone number and when selecting to use a telephone exchange device, executing connection setting at said telephone relay device so as to connect a call from said telephone terminal which designates the calling destination telephone number to said selected telephone exchange device;

a telephone number information transmission processing of transmitting telephone number information of said telephone relay device to said telephone terminal which designates the calling destination telephone number; and a connection destination confirmation processing of receiving a calling source telephone number from a telephone exchange device, obtaining a telephone number of a telephone terminal to which the calling source telephone number is assigned as a deputy telephone number from said telephone relay device and transmitting a calling destination telephone number designated by said telephone terminal having the obtained telephone number as a response to said telephone exchange device.

15. A telephone controlling program for causing a computer mounted on a telephone control device connected to a plurality of telephone terminals, a plurality of telephone exchange devices and a telephone relay device, which program makes a computer execute:

a designation accepting processing of accepting designation of a calling destination telephone number from a telephone terminal;

a connection setting processing of selecting a telephone exchange device from among said plurality of telephone exchange devices based on the calling destination telephone number accepted at said designation accepting processing or selecting not to use a telephone exchange device, and when selecting not to use a telephone exchange device, giving a connection instruction to said telephone relay device to enable, after connecting both said telephone terminal which designates the calling destination telephone number and the calling destination telephone number to the call, communication between both of said telephone terminals and when selecting to use a telephone exchange device, giving a connection instruction to said telephone relay device to enable, after connecting both said telephone terminal which designates the calling destination telephone number and said selected telephone exchange device to the call, communication between both of said telephone terminals; and a connection destination confirmation processing of receiving a calling source telephone number from a telephone exchange device, obtaining a telephone number of a telephone terminal to which the calling source telephone number is assigned as a deputy telephone number from said telephone relay device and transmitting a calling destination telephone number designated by said telephone terminal having the obtained telephone number as a response to said telephone exchange device.

16. A telephone control system having a plurality of telephone terminals and a plurality of telephone exchange devices connected to a plurality of stages of layered structure, and a telephone control device connected to said telephone terminals and said telephone exchange devices, said telephone control device comprising:

a designation accepting unit which accepts designation of a calling destination telephone number from a telephone terminal;

a connection setting unit which selects a telephone exchange device from telephone exchange devices connected to a second stage among said plurality of telephone exchange devices based on a calling destination telephone number accepted by said designation accepting unit or selects not to use a telephone exchange device connected to the second stage, and when selecting not to use a telephone exchange device connected to the second stage, executes connection setting at a first-stage telephone exchange device so as to connect a call from a telephone terminal which designates the calling destination telephone number to the calling destination telephone number and when selecting to use a telephone exchange device connected to the second stage, executes connection setting at a first-stage telephone exchange device so as to connect a call from said telephone terminal which designates the calling destination telephone number to the selected second-stage telephone exchange device, as well as executes connection setting at said selected second-stage telephone exchange device so as to connect a call from said telephone terminal which designates the calling destination telephone number to the calling destination telephone number; and a telephone number information transmission unit which transmits telephone number information of said first-stage telephone exchange device to a telephone terminal which designates a calling destination telephone number.

17. A telephone control system having a plurality of telephone terminals and a plurality of telephone exchange devices connected to a plurality of stages of layered structure, and a telephone control device connected to said telephone terminals and said telephone exchange devices, said telephone control device comprising:
  a designation accepting unit which accepts designation of a calling destination telephone number from a telephone terminal;
  a connection setting unit which selects a telephone exchange device from among said plurality of telephone exchange devices based on a calling destination telephone number accepted by said designation accepting unit or selects not to use a telephone exchange device, and when selecting not to use a telephone exchange device, executes connection setting at a telephone relay device so as to connect a call from a telephone terminal which designates the calling destination telephone number to the calling destination telephone number and when selecting to use a telephone exchange device, executes connection setting at said telephone relay device so as to connect a call from said telephone terminal which designates the calling destination telephone number to said selected telephone exchange device, as well as after obtaining a deputy telephone number for said telephone terminal, executes connection setting at said selected telephone exchange device so as to connect a call from said deputy telephone number to the calling destination telephone number; and
  a telephone number information transmission unit which transmits telephone number information of said telephone relay device to a telephone terminal which designates a calling destination telephone number.

18. A telephone control system having a plurality of telephone terminals and a plurality of telephone exchange devices connected to a plurality of stages of layered structure, and a telephone control device connected to said telephone terminals and said telephone exchange devices, said telephone control device comprising:
  a designation accepting unit which accepts designation of a calling destination telephone number from a telephone terminal; and
  a connection setting unit which selects a telephone exchange device from among said plurality of telephone exchange devices based on a calling destination telephone number accepted at said designation accepting unit or selects not to use a telephone exchange device, and when selecting not to use a telephone exchange device, gives a connection instruction to a telephone relay device so as to enable, after connecting both a telephone terminal which designates a calling destination telephone number and the calling destination telephone number to the call, communication between both of said telephone terminals and when selecting to use a telephone exchange device, with a deputy telephone number to said telephone terminal which designates the calling destination telephone number assigned to said telephone relay device, executes connection setting at said selected telephone exchange device so as to connect a call from the deputy telephone number to the calling destination telephone number, as well as gives a connection instruction to said telephone relay device to enable, after connecting both said telephone terminal which designates the calling destination telephone number and said selected telephone exchange device to the call, communication between both of said telephone terminals.

19. A telephone control system having a plurality of telephone terminals and a plurality of telephone exchange devices connected to a plurality of stages of layered structure, and a telephone control device connected to said telephone terminals and said telephone exchange devices, said telephone control device comprising:
  a designation accepting unit which accepts designation of a calling destination telephone number from a telephone terminal;
  a connection setting unit which selects a telephone exchange device from among said plurality of telephone exchange devices based on a calling destination telephone number accepted by said designation accepting unit or selects not to use a telephone exchange device, and when selecting not to use a telephone exchange device, executes connection setting at a telephone relay device so as to connect a call from a telephone terminal which designates the calling destination telephone number to the calling destination telephone number and when selecting to use a telephone exchange device, executes connection setting at said telephone relay device so as to connect a call from said telephone terminal which designates the calling destination telephone number to said selected telephone exchange device;
  a telephone number information transmission unit which transmits telephone number information of said telephone relay device to a telephone terminal which designates a calling destination telephone number; and
  a connection destination confirmation unit which receives a calling source telephone number from a telephone exchange device, obtains a telephone number of a telephone terminal to which the calling source telephone number is assigned as a deputy telephone number from said telephone relay device and transmits a calling destination telephone number designated by said telephone terminal having the obtained telephone number as a response to said telephone exchange device.

20. A telephone control system having a plurality of telephone terminals and a plurality of telephone exchange devices connected to a plurality of stages of layered structure, and a telephone control device connected to said telephone terminals and said telephone exchange devices, said telephone control device comprising:
  a designation, accepting unit which accepts designation of a calling destination telephone number from a telephone terminal;
  a connection setting unit which selects a telephone exchange device from among said plurality of telephone exchange devices based on a calling destination telephone number accepted by said designation accepting unit or selects not to use a telephone exchange device, and when selecting not to use a telephone exchange device, gives a connection instruction to a telephone relay device to enable, after connecting both a telephone terminal which designates the calling destination telephone number and the calling destination telephone number to the call, communication between both of said telephone terminals and when selecting to use a telephone exchange device, gives a connection instruction to said telephone relay device to enable, after connecting both a telephone terminal which designates the calling destination telephone number and said selected telephone exchange device to the call, communication between both of said telephone terminals; and a connection destination confirmation unit which receives a calling source telephone number from a telephone exchange device, obtains a telephone number of a telephone terminal to which the calling source telephone number is assigned as a deputy telephone number from said telephone relay device and transmits a calling destination telephone number designated by said telephone terminal having the obtained telephone number as a response to said telephone exchange device.

* * * * *